(12) United States Patent
Matsuzawa et al.

(10) Patent No.: US 9,426,392 B2
(45) Date of Patent: Aug. 23, 2016

(54) IMAGING DEVICE, IMAGE PROCESSING DEVICE, RECORDING MEDIUM IN WHICH IMAGE FILE IS RECORDED, RECORDING METHOD, IMAGE PLAYBACK METHOD, AND COMPUTER-READABLE RECORDING MEDIUM

(71) Applicant: Olympus Corporation, Hachioji-shi, Tokyo (JP)

(72) Inventors: Yoshinori Matsuzawa, Hachioji (JP); Manabu Ichikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/551,391

(22) Filed: Nov. 24, 2014

(65) Prior Publication Data

US 2015/0077603 A1 Mar. 19, 2015

Related U.S. Application Data

(63) Continuation of application No. PCT/JP2013/057072, filed on Mar. 13, 2013.

(30) Foreign Application Priority Data

May 31, 2012 (JP) ................................. 2012-125410

(51) Int. Cl.
*H04N 5/228* (2006.01)
*H04N 5/355* (2011.01)
(Continued)

(52) U.S. Cl.
CPC ........ *H04N 5/35572* (2013.01); *H04N 5/2355* (2013.01); *H04N 5/23209* (2013.01);
(Continued)

(58) Field of Classification Search
CPC ..................... H04N 5/35572; H04N 5/23212; H04N 5/3696; H04N 5/23209; H04N 5/77; G06T 1/00
USPC .......................... 348/221.1, 223.1–229.1, 362
See application file for complete search history.

(56) References Cited

U.S. PATENT DOCUMENTS 4,480,636 A * 11/1984 Karaki ................... A61B 1/042
348/247
5,309,243 A * 5/1994 Tsai ...................... H04N 1/4072
348/221.1
(Continued)

FOREIGN PATENT DOCUMENTS

| EP | 1 814 315 | 8/2007 |
| JP | 10-285541 | 10/1998 |
| JP | 2007-334708 | 12/2007 |
| JP | 2009-105681 | 5/2009 |

OTHER PUBLICATIONS

International Search Report for PCT/JP2013/057072 (3 pgs.) with translation (1 pg.).
Written Opinion for PCT/JP2013/057072 (4 pgs.).
(Continued)

*Primary Examiner* — Yogesh Aggarwal
(74) *Attorney, Agent, or Firm* — John C. Pokotylo; Straub & Pokotylo

(57) ABSTRACT

An imaging device includes: an imaging unit having an imaging element formed of a plurality of pixels, and configured to perform imaging under a first exposure condition to generate first image data and to perform imaging under a second exposure condition different from the first exposure condition to generate second image data; an image composition unit configured to generate composite image data with an expanded dynamic range based on the first image data and the second image data; and an image file generation unit configured to generate an image file in which the first image data, the second image data, the composite image data, and position information on positions of pixels mutually replaced in a first image corresponding to the first image data and a second image corresponding to the second image data when the image composition unit generates the composite image data, are recorded in association with one another.

14 Claims, 16 Drawing Sheets

(51) Int. Cl.
*H04N 5/77* (2006.01)
*H04N 5/232* (2006.01)
*H04N 5/369* (2011.01)
*H04N 5/235* (2006.01)
*H04N 5/367* (2011.01)
*H04N 9/04* (2006.01)
*G06T 1/00* (2006.01)

(52) U.S. Cl.
CPC ...... *H04N5/23212* (2013.01); *H04N 5/23216* (2013.01); *H04N 5/23293* (2013.01); *H04N 5/367* (2013.01); *H04N 5/3696* (2013.01); *H04N 5/77* (2013.01); *H04N 9/045* (2013.01); *G06T 1/00* (2013.01)

(56) References Cited

U.S. PATENT DOCUMENTS

| 6,650,365 | B1 | 11/2003 | Sato |
| 7,474,338 | B2 | 1/2009 | Sato |
| 7,986,361 | B2 * | 7/2011 | Manabe ................ G06T 3/4015 |
| | | | 348/222.1 |
| 2004/0012694 | A1 | 1/2004 | Sato |
| 2006/0109373 | A1 | 5/2006 | Kurane |

OTHER PUBLICATIONS

European Search Report to European Patent Application No. 13797232.9, mailed on Mar. 10, 2016 (9 pgs.).

* cited by examiner

FIG.7
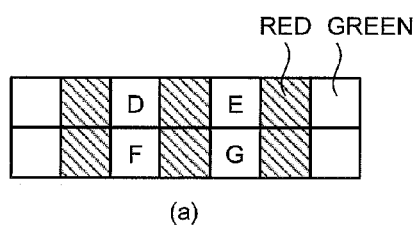
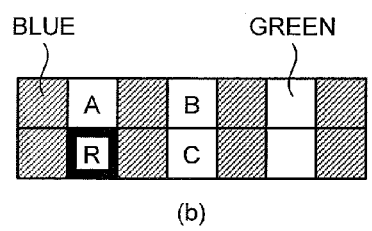

IMAGING DEVICE, IMAGE PROCESSING DEVICE, RECORDING MEDIUM IN WHICH IMAGE FILE IS RECORDED, RECORDING METHOD, IMAGE PLAYBACK METHOD, AND COMPUTER-READABLE RECORDING MEDIUM

CROSS-REFERENCE TO RELATED APPLICATIONS

This application is a continuation of PCT international application Ser. No. PCT/JP2013/057072 filed on Mar. 13, 2013 which designates the United States, incorporated herein by reference, and which claims the benefit of priority from Japanese Patent Application No. 2012-125410, filed on May 31, 2012, incorporated herein by reference.

BACKGROUND

1. Technical Field

The disclosure relates to an imaging device for imaging an object and performing photoelectric conversion to generate electronic image data, an image processing device for performing image processing on image data, a recording medium in which an image file is recorded, a method of recording image data, an image playback method of an image file in which image data is recorded, and a computer-readable recording medium.

2. Related Art

In recent years, among imaging devices such as digital cameras and video cameras, ones that record an imaging result in a recording medium such as a memory card, in a raw data format, are known. Here, the raw data is image data of an imaging result obtained from an imaging element, and is image data before image quality correction, to which a series of image quality correction processing for displaying the imaging result has not been executed, the series of image quality correction processing including γ correction processing, white balance adjustment processing, and frequency characteristic correction processing. As the imaging device that records such raw data, one that records the raw data before image quality correction, and image quality identification information that identifies image quality correction processing at the time of shooting, in association with each another, is known (see Japanese Laid-open Patent Publication No. 2007-334708).

SUMMARY

In some embodiments, an imaging device includes: an imaging unit having an imaging element formed of a plurality of pixels, and configured to perform imaging under a first exposure condition to generate first image data and to perform imaging under a second exposure condition different from the first exposure condition to generate second image data; an image composition unit configured to generate composite image data with an expanded dynamic range based on the first image data and the second image data; and an image file generation unit configured to generate an image file in which the first image data, the second image data, the composite image data, and position information on positions of pixels mutually replaced in a first image corresponding to the first image data and a second image corresponding to the second image data when the image composition unit generates the composite image data, are recorded in association with one another.

In some embodiments, an image processing device performs image processing on image data in an image file generated by an imaging device including an image unit having an imaging element formed of a plurality of pixels. The image processing device includes an image processing unit configured to acquire an image file in which first image data imaged and generated by the imaging unit under a first exposure condition, a second image data imaged and generated under a second exposure condition different from the first exposure condition, and position information on positions of pixels mutually replaceable in a first image corresponding to the first image data and a second image corresponding to the second image data are recorded in association with one another, and to combine the first image data and the second image data to generate processed image data with an expanded dynamic range, based on the position information recorded in the image file.

In some embodiments, a recording medium in which an image file generated by an imaging device including an imaging unit having an imaging element formed of a plurality of pixels is recorded is provided. In the image file, first image data imaged and generated by the imaging unit under a first exposure condition; second image data imaged and generated under a second exposure condition different from the first exposure condition; and position information on positions of pixels mutually replaceable in a first image corresponding to the first image data and a second image corresponding to the second image data, are recorded.

In some embodiments, a recording method is executed by an imaging device including an imaging unit having an imaging element formed of a plurality of pixels. The recording method includes: a first generation step of performing imaging under a first exposure condition to generate first image data; a second generation step of performing imaging under a second exposure condition different from the first exposure condition to generate second image data; an image composition step of generating composite image data with an expanded dynamic range, based on the first image data and the second image data; and an image file generation step of generating an image file in which the first image data, the second image data, the composite image data, and position information on positions of pixels mutually replaced in a first image corresponding to the first image data and a second image corresponding to the second image data when the composite image data is generated in the image composition step, are recorded in association with one another.

In some embodiments, a non-transitory computer-readable recording medium has an executable program stored thereon. The program instructs an imaging device including an imaging unit having an imaging element formed of a plurality of pixels, to perform: a first generation step of performing imaging under a first exposure condition to generate first image data; a second generation step of performing imaging under a second exposure condition different from the first exposure condition to generate second image data; an image composition step of generating composite image data with an expanded dynamic range, based on the first image data and the second image data; and an image file generation step of generating an image file in which the first image data, the second image data, the composite image data, and position information on positions of pixels mutually replaced in a first image corresponding to the first image data and a second image corresponding to the second image data when the composite image data is generated in the image composition step, are recorded in association with one another.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram for explaining a method of interpolation on a pixel performed by the imaging unit of the imaging device according to the first embodiment of the present invention;

DETAILED DESCRIPTION

Hereinafter, modes for carrying out the invention (hereinafter, referred to as "embodiments") will be described with reference to the drawings. The invention is not limited by these embodiments. The same reference signs are used to refer to the same elements throughout the drawings.

First Embodiment

Figure 1:
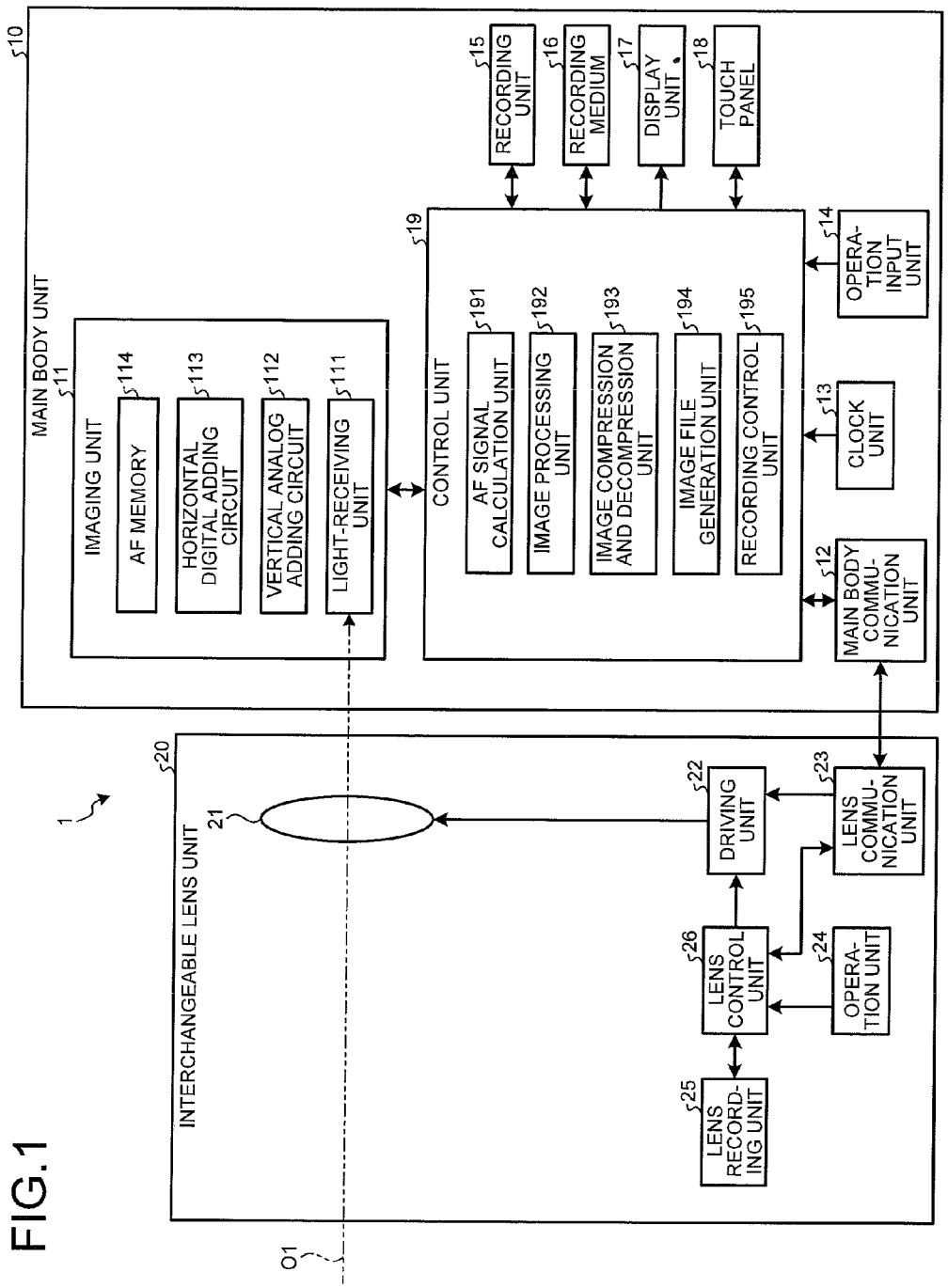
FIG. 1 is a block diagram illustrating a functional configuration of an imaging device according to a first embodiment of the present invention.

FIG. 1 is a block diagram illustrating a functional configuration of an imaging device according to a first embodiment of the present invention. An imaging device 1 illustrated in FIG. 1 includes a main body unit 10 and an interchangeable lens unit 20 detachable from the main body unit 10 and collecting light from a specified visual field area.

The main body unit 10 includes an imaging unit 11, a main body communication unit 12, a clock unit 13, an operation input unit 14, a recording unit 15, a recording medium 16, a display unit 17, a touch panel 18, and a control unit 19.

The imaging unit 11 is configured from an imaging element such as a CCD or CMOS sensor. The imaging unit 11 may be an imaging element that outputs one data from one pixel like an imaging element having a Bayer array or an imaging element that includes a layered light-receiving unit and outputs a plurality of data like RGB from one pixel. The imaging unit 11 is driven under control of the control unit 19. The imaging unit 11 receives light of an object from the interchangeable lens unit 20 with light-receiving surfaces of a plurality of pixels through a shutter (not illustrated) and generates an electric signal after photoelectric conversion as image data (raw data) before image quality correction. To be specific, the imaging unit 11 generates image data obtained by replacing an electrical signal output from a replacement pixel that is a target of replacement among a plurality of electrical signals respectively output from a plurality of pixels, with an electrical signal of a different pixel for imaging obtained at the same time or at different timing, and outputs the image data to the control unit 19. At this time, the imaging unit 11 outputs position information (address information) on positions of the replacement pixel and of the pixel for imaging obtained by performing interpolation on the replacement pixel, to the control unit 19. Here, the replacement pixel is any one of a defective pixel in which a pixel is defective, a pixel for detection (hereinafter, referred to as "AF pixel") in detecting a focus of imaging device 1, a pixel having a color filter (a BPF for detecting a specific wavelength or the like) different from pixels that configure an image in order to obtain characteristics of a light source and characteristics of a color of an object, an OB image extracted in optical black extraction, an extracted pixel extracted in edge extraction, and a correction pixel that is a target of correction to be corrected by interpolating a pixel signal using another image data. Here, the correction pixel is a dedicated functional pixel for adjusting shooting parameters, or a pixel corresponding to an image area determined by shooting conditions. Further, the shooting parameters are an exposure value, a shutter speed, ISO sensitivity, and white balance. Further, the shooting conditions are object depth information, object brightness information, and object color information. In recent years, there are imaging elements having various functions, and not all of pixels can be used for imaging. Therefore, it is necessary to know pixel data not used for image formation, pixel data not suitable for use, and pixel data used other than for image at the time of forming an image. If these pixel data are known, the pixels can be corrected, substituted, or replaced, so that a favorable image can be played back. Further, there may be a pixel better not to be used depending on a problem of a shooting optical system. Therefore, it is favorable not to use a signal of such a pixel as it is at the time of playback, and to correct, substitute, or replace the pixel.

A detailed configuration of the imaging unit 11 will be described. The imaging unit 11 includes a light-receiving unit 111, a vertical analog adding circuit 112, a horizontal digital adding circuit 113, and an AF memory 114.

The light-receiving unit 111 has a plurality of pixels arranged in a matrix manner, receives light from an object from the interchangeable lens unit 20, performs photoelectric conversion, and outputs an electrical signal.

The vertical analog adding circuit 112 adds and reads values of pixels in two rows from the light-receiving unit 111, and outputs an added pixel value of the two rows to the horizontal digital adding circuit 113.

The horizontal digital adding circuit 113 adds the added pixel value of the two rows input from the vertical analog adding circuit 112 over two columns, and outputs an added pixel value of four pixels to the control unit 19 as an added pixel value at the time of imaging a moving image, and also outputs the added pixel value to the AF memory 114 and records the added pixel value therein as a pixel value of an AF pixel.

Figure 2:
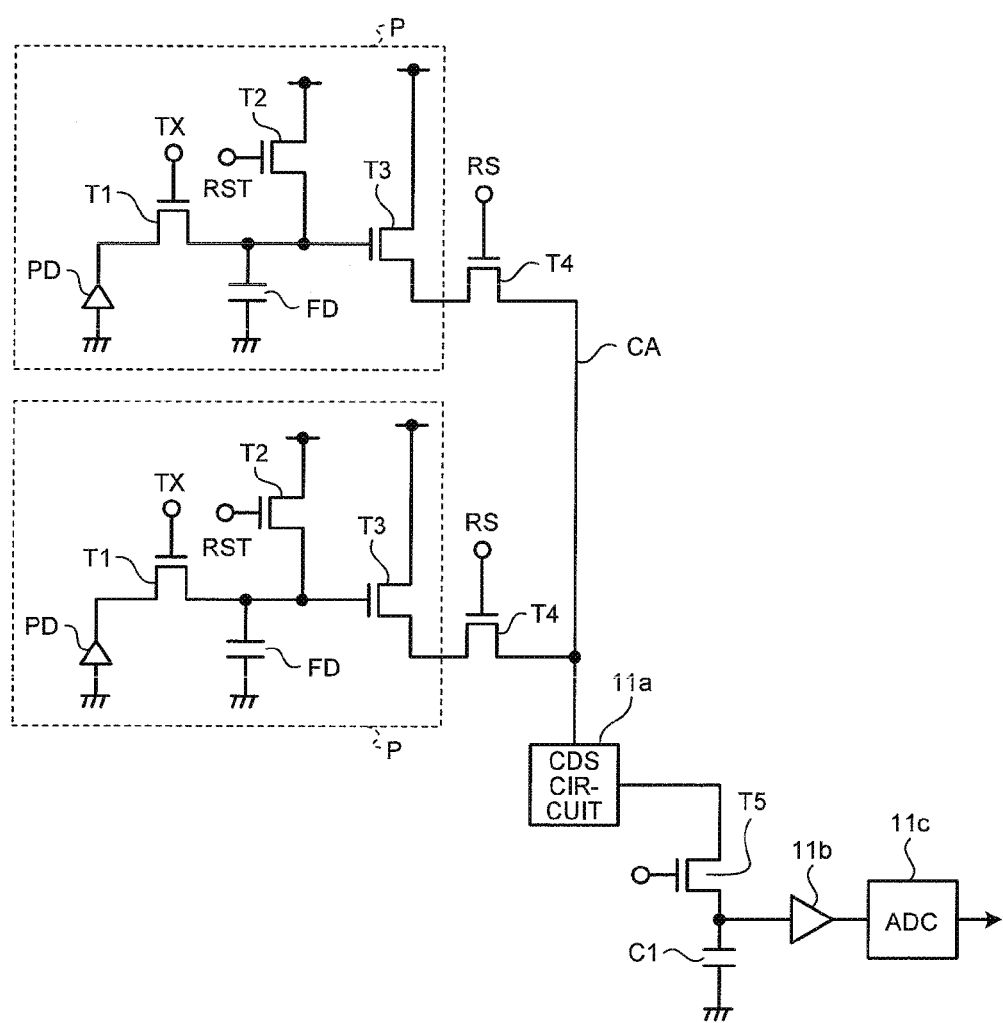
FIG. 2 is a circuit diagram illustrating an example of configurations of a light-receiving unit and vertical analog adding circuit in an imaging unit of the imaging device according to the first embodiment of the present invention.

FIG. 2 is a circuit diagram illustrating an example of configurations of the light-receiving unit 111 and the vertical analog adding circuit 112. The light-receiving unit 111 is configured from a plurality of pixels arranged in a matrix manner. FIG. 2 illustrates configurations of only two pixels P (broken lines) of two rows of the same color of the light-receiving unit 111.

As illustrated in FIG. 2, each of the pixels P is configured from a photodiode PD, a transfer transistor T1, a floating diffusion FD, a reset transistor T2, and an amplifier transistor T3. The photodiode PD generates a charge according to received light. The charge generated in the photodiode PD is transmitted to the floating diffusion FD by the transfer transistor T1 and accumulated therein. The reset transistor T2 sets a reset and an accumulation period of the floating diffusion FD. A voltage based on a signal charge of the floating diffusion FD is amplified by the amplifier transistor T3.

A row selection switch T4 is turned ON and OFF by a row selection signal, and outputs a signal current from the amplifier transistor T3 to a CDS circuit 11a through a column line CA. All of the row selection switches T4 of one column are connected to a common column line CA. When all of the row selection switches T4 of the same row are turned ON at the same time, signals are supplied from all of the pixels P of the same row to the respective CDS circuits 11a through the respective column lines CA.

In the pixel P configured as described above, the row selection switch T4 is selectively turned ON for each line by a vertical scanning circuit (not illustrated) at the time of capturing a still image. Further, the row selection switches T4 of two rows of the same color of each one line are turned ON by the vertical scanning circuit at the time of imaging a moving image. Accordingly, pixel values of the pixels P of two rows of the same color are output through the column line CA at the time of capturing a moving image.

The CDS circuit 11a removes a reset noise of the pixel value of the two rows of the same color and outputs the pixel value. The output of the CDS circuit 11a is accumulated in a capacitor C1 through a transistor T5. At the time of imaging a moving image, a charge of a sum of pixel values of two pixels is accumulated in the capacitor C1. The accumulated charge in the capacitor C1 is supplied to an analog/digital converter (ADC) 11c through an amplifier 11b, converted into a digital signal, and output to the control unit 19. As described above, from the ADC 11c provided in each column line CA, an added pixel value of the pixels P of two rows of the same color is output. Note that the outputs of the ADCs 11c are sequentially output by a horizontal scanning circuit (not illustrated).

For simplifying the structure of the light-receiving unit 111, and accelerating the processing, it is necessary to share the structure of each pixel, a reading procedure, and the like among the pixels. Therefore, the imaging unit 11 can output only the added pixel value of the pixels P of two rows of the same color, and cannot output a pixel value of a single pixel P at the time of capturing a moving image. Further, in the imaging unit 11, when reading of pixels P of two rows has been completed by the horizontal scanning circuit, reading of pixels P of the next two rows is performed at the time of capturing a moving image. Note that every time the reading of pixels P of two rows is completed, each pixel P of these two rows is reset.

Referring back to FIG. 1, the configuration of the imaging device 1 will be described.

The main body communication unit 12 is a communication interface for performing communication with the interchangeable lens unit 20 mounted to the main body unit 10. The main body communication unit 12 includes an electric contact with the interchangeable lens unit 20.

The clock unit 13 has a timing function and a function to determine a shooting date and time. The clock unit 13 outputs date and time data to the control unit 19 to add the date and time data to the image data imaged by the imaging unit 11.

The operation input unit 14 includes, as user interfaces for operation input, a power source switch that switches a power source state of the imaging device 1 to an ON state or to an OFF state, a release switch that receives an input of a still image release signal that provides an instruction of capturing a still image, a mode dial switch that switches various shooting modes set to the imaging device 1, an operation switch that switches various types of setting of the imaging device 1, a menu switch that allows the various types of setting of the imaging device 1 to be displayed in the display unit 17, a playback switch that allows an image corresponding to image data recorded in the recording medium 16 to be displayed in the display unit 17, and a moving image switch that receives an input of a moving image release signal that provides an instruction of capturing a moving image. The release switch can be advanced and retreated by pressing from an outside. When the release switch is half-pressed, a 1st release signal that instructs a shooting preparation operation is input. In contrast, when the release switch is fully pressed, a 2nd release signal that instructs capturing a still image is input.

The recording unit 15 is configured from a volatile memory and non-volatile memory. The recording unit 15 temporarily records image data input from the imaging unit 11 through the control unit 19 and information in processing of the imaging device 1. Further, the recording unit 15 records various programs for operating the imaging device 1, an imaging program, and various data and various parameters used in execution of the program. Further, the recording unit 15 records a serial number for identifying the imaging device 1.

The recording medium 16 is configured from a memory card or the like mounted from an outside of the imaging device 1. The recording medium 16 is detachably mounted to the imaging device 1 through a memory I/F (not illustrated). In the recording medium 16, an image file in which image data is recorded is written under control of the control unit 19, or the image data of the image file recorded in the recording medium 16 is read out. In the first embodiment, image data generated by the imaging unit 11 and obtained by replacing an electrical signal output from a replacement pixel as a target of replacement with an electrical signal of a different pixel for imaging obtained at the same time or at different timing, and position information on a position of the replacement pixel in the imaging unit 11, are recorded in the image file.

The display unit 17 is configured by a display panel made of liquid crystal or organic electro luminescence (EL). The display unit 17 displays an image corresponding to image data. Here, display of an image includes a rec-view display in which image data right after shooting is displayed only for a specified time (for example, for three seconds), a playback display in which image data recorded in the recording medium 16 is plays back, live view image in which live view images corresponding to image data continuously generated by the imaging unit 11 are sequentially displayed in time series, and the like. Further, the display unit 17 appropriately displays operation information of the imaging device 1 and information related to shooting.

The touch panel 18 is provided on a display screen of the display unit 17. The touch panel 18 detects touch of a material body from an outside, and outputs a positional signal according to a detected touch position. Further, the touch panel 18 may detect a position touched by the user based on information displayed in the display unit 17, and receive an input of an instruction signal that instructs an operation to be performed by the imaging device 1 according to a contact position. Typically, as the touch panel 18, there are a resistive film type touch panel, an electrostatic capacity type touch panel, an optical type touch panel, and the like. In the first embodiment, any type of touch panel is applicable.

The control unit 19 is configured from a central processing unit (CPU), and the like. The control unit 19 transmits control signals or various data to respective units that configure the imaging device 1 in response to instruction signals input from the operation input unit 14 or the touch panel 18, thereby to comprehensively control the operation of the imaging device 1.

A detailed configuration of the control unit 19 will be described. The control unit 19 includes an AF signal calculation unit 191, an image processing unit 192, an image compression and decompression unit 193, an image file generation unit 194, and a recording control unit 195.

The AF signal calculation unit 191 acquires image signals of pixels in a specified area from the image data input from the imaging unit 11, and generates an AF signal by pupil division phase difference method based on a phase difference of the acquired image signals. The AF signal calculation unit 191 outputs the AF signal to the interchangeable lens unit 20 through the main body communication unit 12. Note that details of the pupil division phase difference method by the AF signal calculation unit 191 will be described below.

The image processing unit 192 generates processed image data obtained such that various types of image processing including image quality correction processing is applied to image data (raw data) input from the imaging unit 11. To be specific, the image processing unit 192 applies, to the image data, image processing including gain processing of adjusting at least brightness of the image, gradation correction processing of correcting gradation, edge processing, smoothing processing, white balance processing, color correction processing, noise reduction processing, γ correction processing, and color phase processing according to a shooting mode, thereby to generate processed image data for display or for recording. Here, the shooting mode is a mode to correct the image quality of an image to be developed according to a scene, such as person shooting (portrait shooting), landscape shooting, or night view shooting. Note that, in the first embodiment, the image processing unit 192 functions as an image processing device.

The image compression and decompression unit 193 compresses the processed image data subjected to the image processing by the image processing unit 192 according to a specified system, and outputs compressed image data to the recording medium 16. Here, examples of the specified format include the Joint Photographic Experts Group (JPEG) system, the Motion JPEG system, and MP4 (h.264) system. Further, the image compression and decompression unit 193 acquires the image data (compressed image data) recorded in the recording medium 16, decompresses (expands) the acquired image data, and outputs decompressed image data to the image file generation unit 194 or the recording unit 15.

The image file generation unit 194 generates an image file in which the image data (raw data) before image quality correction, the processed image data and the compressed image data, the position information (address information) on positions of the replacement pixel and of the pixel for imaging obtained by performing interpolation on the replacement pixel, or range information that indicates a range including the positions in the imaging unit 11, the shooting mode of the imaging device 1, and the shooting information including an image processing parameter of the image processing unit 192 are recorded in association with one another. Note that details of the image file generated by the image file generation unit 194 will be described below. Here, the term "interpolation" is used because of supplementing insufficient pixel information. However, the action performed here may be rephrased with "replacement".

The recording control unit 195 records the image file generated by the image file generation unit 194 in the recording medium 16. Further, the recording control unit 195 causes the image file generation unit 194 to generate an image file having content according to an instruction signal input from the operation input unit 14 or the touch panel 18. To be specific, the recording control unit 195 causes the image file generation unit 194 to generate an image file in which the raw data and the shooting information are recorded in association with each other, and records the image file in the recording medium 16.

An audio input/output unit, an auxiliary light emission unit that emits auxiliary light (flash) to an object, a communication unit having a function to bidirectionally perform communication with an external image processing device through the Internet, and the like may be further provided in the main body unit 10 having the above configurations.

Next, the interchangeable lens unit 20 will be described. The interchangeable lens unit 20 includes an optical system 21, a driving unit 22, a lens communication unit 23, an operation unit 24, a lens recording unit 25, and a lens control unit 26.

The optical system 21 is configured from one or a plurality of lenses and a diaphragm. The optical system 21 collects light from a specified visual field area. The optical system 21 has an optical zoom function to change an angle of view and a focus function to change a focal point.

The driving unit 22 is configured from a DC motor or a stepping motor, and the like, and changes a focus position or the angle of view of the optical system 21 by moving the lens of the optical system 21 on an optical axis O1. Further, the driving unit 22 drives the diaphragm of the optical system 21.

The lens communication unit 23 is a communication interface for performing communication with the main body communication unit 12 of the main body unit 10 when the interchangeable lens unit 20 is connected to the main body unit 10.

The operation unit 24 is a ring provided at a periphery of a lens barrel of the interchangeable lens unit 20, and receives an input of an operation signal that starts an operation of optical zoom in the optical system 21, or an input of an instruction signal that instructs adjustment of the focus position of the optical system 21. Note that the operation unit 24 may be a push type switch, or the like.

The lens recording unit 25 is configured from a flash memory, and records control programs for determining the position and the movement of the optical system 21, lens characteristics of the optical system 21, a focal distance, a brightness number, and various parameters.

The lens control unit 26 is configured from a CPU and the like. The lens control unit 26 controls the operation of the interchangeable lens unit 20 according to an operation signal of the operation unit 24 or an instruction signal from the main body unit 10. To be specific, the lens control unit 26 drives the driving unit 22 to focus the optical system 21 according to the operation signal of the operation unit 24, thereby to perform zoom change or change of a diaphragm value. Further, the lens control unit 26 transmits focus position information of the interchangeable lens unit 20, a focal distance, unique information that identifies the interchangeable lens unit 20, and the like to the main body unit 10 when the interchangeable lens unit 20 is mounted to the main body unit 10.

Figure 3:
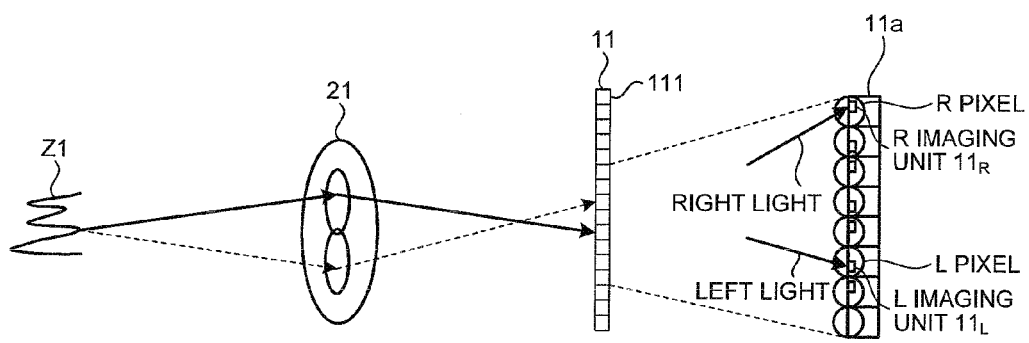
FIG. 3 is a schematic diagram describing an outline of a pupil division phase difference method performed by an AF signal calculation unit of the imaging device according to the first embodiment of the present invention.

Next, the pupil division phase difference method performed by the AF signal calculation unit 191 will be described. FIG. 3 is a schematic diagram describing an outline of the pupil division phase difference method performed by the AF signal calculation unit 191.

As illustrated in FIG. 3, an optical image incident on the imaging device 1 through respective optical paths from an object Z1 forms an image on an incident surface of the imaging element of the imaging unit 11 by the optical system 21. Two imaging units (for example, an R imaging unit and an L imaging unit) are configured as pixels for AF detection (hereinafter, referred to as AF pixels), respective optical paths are divided into a right direction and a left direction at an exit pupil, and light from the right direction (right light) and light from the left direction (left light) are respectively incident on an R imaging unit $11_R$ and an L imaging unit $11_L$. To be specific, as a part of the imaging unit 11 is enlarged and illustrated in FIG. 3, the R imaging unit $11_R$ and the L imaging unit $11_L$ are made eccentric to an optical axis of the optical system 21, whereby the right light and the left right can be respectively incident on the R imaging unit $11_R$ and the L imaging unit $11_L$.

When the image is focused, light from the same point of the object is incident on the R imaging unit $11_R$ and the L imaging unit $11_L$. Therefore, an image signal obtained by a plurality of R imaging units $11_R$ and an image signal obtained by a plurality of L imaging units $11_L$ for AF detection arranged in the horizontal direction are the same.

Figure 4:
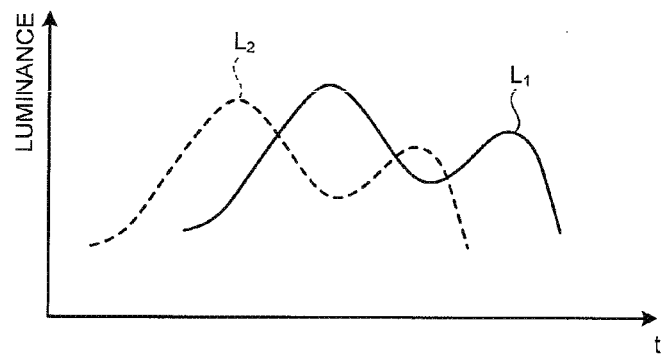
FIG. 4 is a diagram illustrating an image signal obtained by the imaging unit in the pupil division phase difference method performed by the AF signal calculation unit of the imaging device according to the first embodiment of the present invention.

In contrast, when the image is not focused, the light from the same point of the object is incident on the R imaging unit $11_R$ and the L imaging unit $11_L$ at shifted positions according to an amount of deviation of the focus. Therefore, as illustrated in FIG. 4, phases of the image signal (solid line) $L_1$ obtained by the plurality of R imaging units $11_R$ and of the image signal (broken line) $L_2$ obtained by the plurality of L imaging units $11_L$ for AF detection arranged in the horizontal direction are shifted, and the amount of deviation of the phases corresponds to the amount of deviation of the focus. As described above, the AF signal calculation unit 191 generates a drive signal that drives a lens for focus adjustment based on the phase difference between an image signal $L_1$ and an image signal $L_2$ obtained by the R imaging unit $11_R$ and the L imaging unit $11_L$, and outputs the drive signal to the interchangeable lens unit 20 through the main body communication unit 12, thereby to realize auto focus of the imaging device 1.

Figure 5:
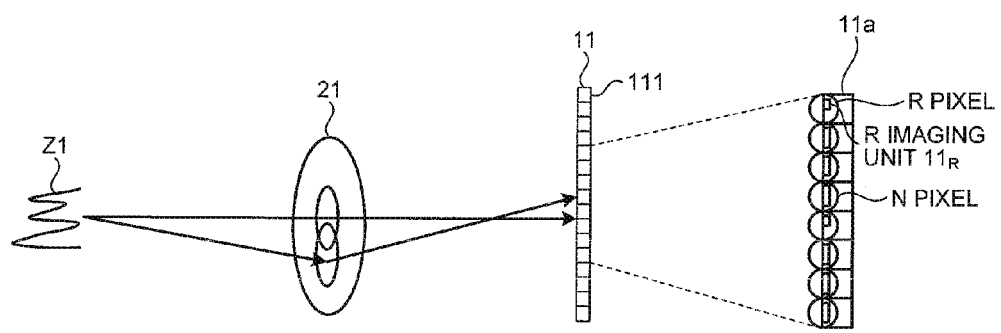
FIG. 5 is a schematic diagram describing an outline of another pupil division phase difference method performed by the AF signal calculation unit of the imaging device according to the first embodiment of the present invention.

Note that, in FIG. 3, to commonalize the structures of the AF pixels and the pixels for imaging (normal pixels), an example in which the AF pixels are configured from the pixels only including the R imaging unit $11_R$ (hereinafter, referred to as R pixels) and the pixels only including the L imaging unit $11_L$ (hereinafter, referred to as L pixels) has been described. Note that, as illustrated in FIG. 5, the AF signal calculation unit 191 may omit the L pixels and only use the R pixels as the AF pixels, and generate the drive signal for focus adjustment by comparing a phase of an image signal obtained by a plurality of pixels for imaging (hereinafter, referred to as N pixels) and a phase of an image signal obtained by the R imaging units $11_R$.

Figure 6:
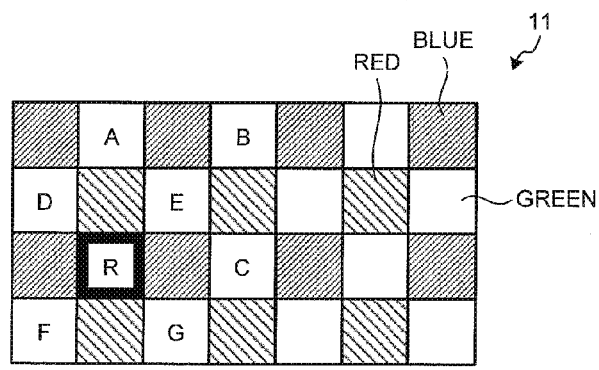
FIG. 6 is a diagram describing a pixel array of the imaging unit of the imaging device according to the first embodiment of the present invention.

Next, a pixel array of the imaging unit 11 will be described in detail. FIG. 6 is a diagram describing a pixel array of the imaging unit 11. In FIG. 6, a pixel with thick hatching represents a blue pixel in which a blue filter is arranged, a pixel with rough hatching represents a red pixel in which a red filter is arranged, a plain pixel represents a green pixel in which a green filter is arranged, a pixel with a border represents the AF pixel. Note that, in FIG. 6, description will be given using a Bayer array as an example of the pixel array. However, a honeycomb array is also applicable, for example.

As illustrated in FIG. 6, in the Bayer array, the same array is repeated where horizontal 2 pixels×vertical 2 pixels are a unit. That is, blue and red pixels are diagonally arranged in the 2×2 pixels, and green pixels are arranged in the remaining diagonally arranged two pixels. In FIG. 6, the reference signs A to G are used for identifying the pixels, the pixel R is the R pixel for AF detection. Note that, in the position of the pixel R of FIG. 3, a green filter for obtaining a green pixel is arranged.

The imaging unit 11 uses a signal read from each pixel as each pixel value of an imaged image as it is at the time of capturing a still image, and performs pixel interpolation after imaging. Meanwhile, the imaging unit 11 generates one pixel of a color by adding pixel values of four pixels of the same color at the time of imaging a moving image. For example, the imaging unit 11 adds green pixels D to G to generate one green pixel, and adds pixels A, B, R, and C to generate a pixel adjacent to the generated pixel. The same applies to other colors. However, the pixel R is not the N pixel, and thus if one pixel is configured using the pixels A, B, R, and C as they are, deterioration of the image quality is caused. Therefore, in the first embodiment, the imaging unit 11 generates image data (raw data) by performing interpolation on the AF pixel with another pixel.

FIG. 7 is a diagram for explaining a method of interpolation on a pixel performed by the imaging unit 11. Note that, in FIG. 7, an example of using only the R pixel as the AF pixel will be described. However, the method is applicable to a case of using only the L pixel as the AF pixel, and a case of using both of the R and L pixels as the AF pixel.

As illustrated in FIG. 7, the imaging unit 11 adds and reads pixels of two rows of the same color when reading an image signal from the light-receiving unit 111 in order to perform processing of generating one pixel by pixels of two columns of two rows of the same color at a high speed when imaging a moving image. When the pixel values of the pixels A to G and R with A to G and R, as illustrated in FIG. 7(a) and FIG. 7(b), as the green pixels, added pixel values (D+F), (E+G), . . . , (A+R), (B+C), . . . are output. Further, regarding the added pixel values read from the imaging unit 11, added pixel values (D+E+F+G), . . . , (A+B+R+C), . . . are obtained by adding pixels of two columns of the same color, as illustrated in FIG. 7(c) and FIG. 7(d). Note that, as described above, the pixel R is the R pixel that outputs the pixel value only by the light incident from the right direction of the exit pupil.

In the first embodiment, one pixel is configured from the R imaging unit $11_R$ and the L imaging unit $11_L$, and if the pixel value of the R imaging unit $11_R$ and the pixel value of the L imaging unit $11_L$ can be added, a pixel value equivalent to the N pixel can be obtained from such an AF pixel. That is, when not only the R imaging unit $11_R$ but also the L imaging unit $11_L$ is provided in the position of the pixel R, the pixel value of the L imaging unit $11_L$ is estimated, and the estimated pixel value of the L imaging unit $11_L$ is added to the pixel value of the Pixel R, whereby the pixel value when the N pixel is configured in the position of the pixel R can be obtained.

Note that the imaging unit 11 performs the above adding and reading for high-speed processing at the time of imaging a moving image, and cannot perform reading such as reading a pixel value of a single pixel from the light-receiving unit 111, other than the adding and reading, at the time of imaging a moving image. Therefore, the imaging unit 11 cannot directly read the pixel value of the pixel R, and cannot directly obtain a pixel value that is twice the pixel R, as a value of the N pixel in the position of the pixel R. Therefore, the position of the pixel R (see FIG. 6) is a central position surrounded by the pixels D to G, and the pixel value when the N pixel is configured in this position is estimated as an added pixel value (D+E+F+G)/4. Further, an added pixel value (D+E+F+G)/8 is the pixel value of the L imaging unit $11_L$, in the position of the pixel R (FIG. 7(c)), assuming that the pixel values of the R imaging unit $11_R$ and the L imaging unit $11_L$ are approximately the same, and a sum of these pixel values are the pixel value of the N pixel. As described above, the imaging unit 11 treats a value obtained such that the added pixel value (D+E+F+G)/8 that is the pixel value of the L imaging unit 11L is added to the added pixel value (A+B+R+C) as the added pixel value when all of the pixels A, B, R, and C are configured from the N pixels (FIG. 7(d)).

Meanwhile, the imaging unit 11 needs to obtain the pixel value (the pixel value of the R imaging unit) in the pixel R for AF processing at the time of imaging a moving image. The added pixel value (A+R) is output from the imaging unit 11, and the image processing unit 192 estimates and subtracts the pixel value of the pixel A from the added pixel value (A+R), thereby to obtain the pixel value of the pixel R. The pixel A is a pixel of the same color close to the central pixel surrounded by the pixels D to G, and thus the pixel value of the pixel A is estimated as the added pixel value (D+E+F+G)/4. In this way, the imaging unit 11 obtains the pixel value of the pixel R by the added pixel value (A+R)− the added pixel value (D+E+F+G)/4 (FIG. 7(e)).

Figure 8:
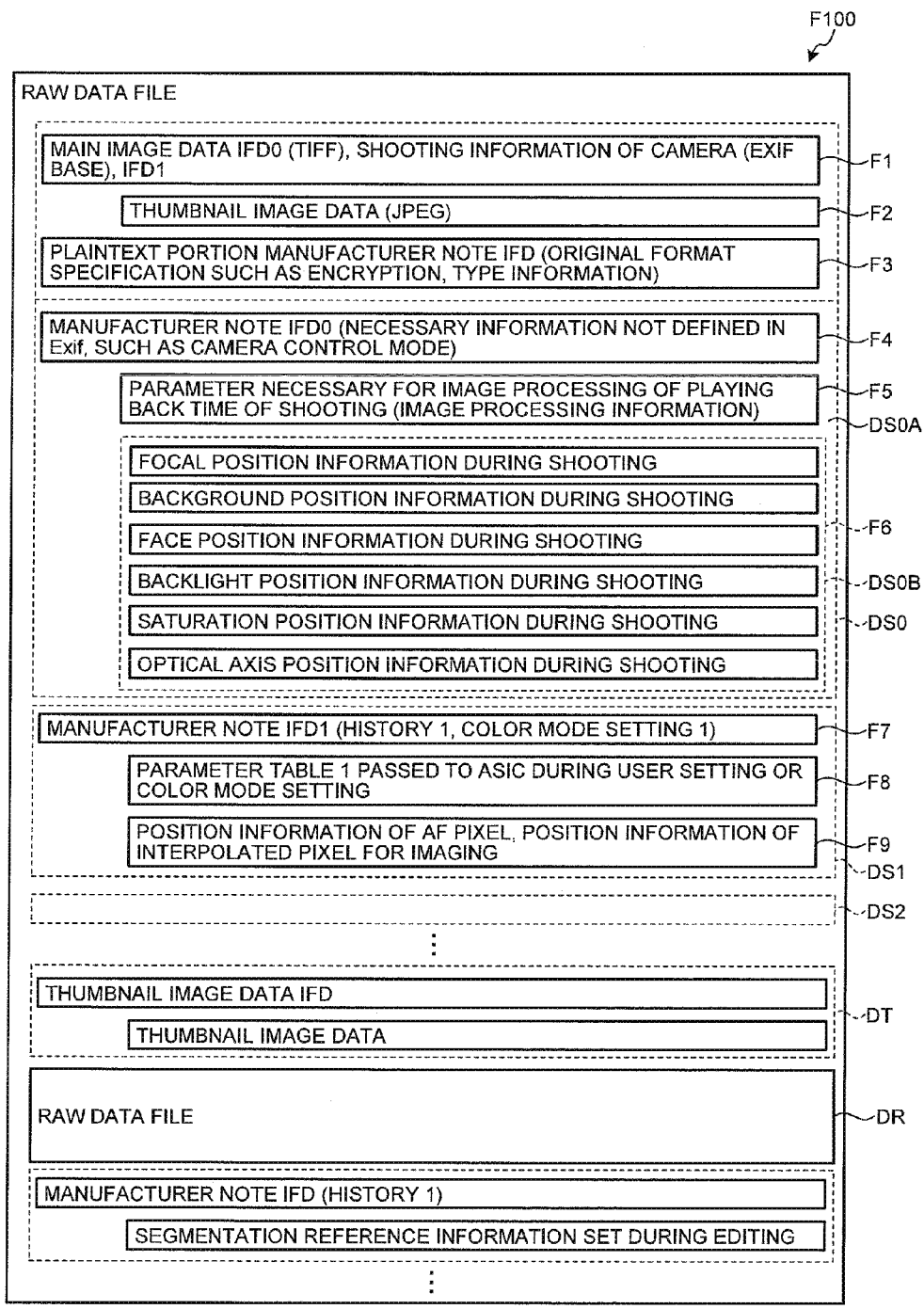
FIG. 8 is a diagram illustrating an example of a configuration of an image file generated by an image file generation unit of the imaging device according to the first embodiment of the present invention.

Next, an image file generated by the image file generation unit 194 will be described. FIG. 8 is a diagram illustrating an example of a configuration of an image file generated by the image file generation unit 194.

An image file F100 illustrated in FIG. 8 is a file in which the raw data is recorded in a format conforming to EXIF, and in which a header is provided, similarly to EXIF, and to which various data is allocated with image file directory (IFD).

Here, in a head field F1 of the file in the image file F100, information (main image data IFD0) necessary for playback of main image data and information (shooting information IFD1) of the time of capturing the main image data are recorded. In the first embodiment, raw data DR is allocated to the main image data, and information that identifies the imaging device 1 used at the time of capturing the raw data and information of the shooting conditions are allocated to information of the time of capturing the main image data. To be specific, corresponding information of EXIF is allocated. Information of a diaphragm, a focal distance, a shutter speed, and the like, information of image quality correction mode, and the like in the image processing unit 192, and information defined in EXIF such as a parameter of the image processing, a file name, and a user name are allocated.

Further, in a field F2 of the image file F100, a thumbnail image data generated in the image compression and decompression unit 193 and compressed in JPEG is allocated. In a field F3, information uniquely defined by the manufacturer of the imaging device 1 (plaintext portion manufacturer note IFD) is recorded. These head three fields F1 to F3 of the image file F100 are created in the EXIF format. Therefore, the image file F100 is formed such that the raw data allocated to the main image data can be played back by various applications capable of processing EXIF files.

Next, in the image file F100, image processing information DSOA of the time of capturing the main image data is allocated. To be specific, in a field F4, setting of the diaphragm (for example, setting of 0 EV, −1 EV, and the like) of the imaging device 1 at the time of capturing the raw data DR, the shutter speed, the shooting mode, and the like are recorded. Further, specific parameters obtained at the time of shooting are sequentially recorded. In the first embodiment, as the parameters, a parameter necessary for image processing of playing back the time of shooting is recorded, then various parameters (hereinafter, referred to as "segmentation reference information") that are references used in partially segmenting the raw data DR are recorded.

That is, in a field F5 of the image file F100, the parameters (hereinafter, referred to as "image processing information") necessary for playing back the time of shooting are recorded. Therefore, the diaphragm is recorded as 0 EV in the head side field F4, and a specific diaphragm value 5.6 and the like are recorded in the image processing information DS0A of the subsequent field F5. Further, the image quality correction mode is recorded in the head side field F4 as an auto white balance adjustment mode, a shooting mode of capturing a person, and the like. Further, a gain of each color signal in the auto white balance adjustment mode, parameters of color correction according to the shooting mode, and the like are recorded in the image processing information DS0A of the field F5.

Further, in a field F6 of the image file F100, various types of segmentation reference information DS0B are set. To be specific, in a field F6, focused position information of the time of shooting detected from focus adjustment is recorded. Here, the focused position information of the time of shooting is position information of a focused area in the image of the raw data DR. Further, focused position information of a background detected in focus search processing of the time of shooting is recorded. In the field F6, position information of a face detected at the time of shooting is recorded. In the imaging device 1, an area where the face is captured is detected by the control unit 19 using a face template, and the area where the face is detected is set to the position information of the face. Note that, when the user selects the shooting mode of capturing a person, the imaging device 1 performs focus adjustment to focus the area where the face is detected and acquires the raw data DR. Note that, when the face is not detected, the fact that the face is not detected is recorded in the position information of face.

Further, in the image file F100, information of backlight position is recorded. Here, the information of backlight position is position information that indicates a portion of backlight in an imaging result. A focused position of each portion of the imaging result is detected in focus search, and an area determined to capture one material body, and having a lower level of luminance at a position closer to the front is detected from the detection result of the focused position, and position information of the detected area is set to the position of the backlight position. Further, in the image file F100, information of a saturation position is recorded. Here, the information of a saturation position is a position of an area where the luminance level is saturated due to a dynamic range of the imaging device 1. The imaging device 1 varies the diaphragm at the time of shooting, and determines change of the luminance level of each portion with respect to the variation of the diaphragm to detect the saturated area. Further, the imaging device 1 sets the position information of the detected area to the information of a saturation position. Further, in the image file F100, position information of an optical axis center at the time of shooting is recorded. Here, the position information of an optical axis center is set based on information that identifies a type of a lens provided to the lens. Note that, when corresponding position information cannot be detected even in these pieces of backlight position information, saturation position information, or optical axis center position information, the facts that these pieces of information cannot be detected are respectively recorded. In the image file F100, other various parameters are then sequentially allocated, and shooting information DS0 of the time of capturing the main image data is formed.

Further, in the image file F100, shooting information DS1, DS2, . . . of editing processing is recorded. Here, the shooting information DS1, DS2, . . . of editing processing is shooting information set in the editing processing, and is set corresponding to the image processing information DS0A for playing back the time of shooting allocated to the shooting information DS0 of the time of shooting. The shooting information DS1, DS2, . . . forms a head side field F7 such that history information is added to the shooting information of the setting of diaphragm, the shutter speed, the shooting mode, and the like allocated to the field F4 of the shooting information DS0 of the time of shooting. Note that the history information is information of date and time at which the shooting information DS1, DS2, . . . is set to the image file F100. Further, in a field F8 of the image file F100, specific image processing information corresponding to the shooting information allocated to the previous field F7 is recorded.

Further, in a field F9 of the image file F100, position information of the AF pixel related to the position of the AF pixel in the light-receiving unit 111 of the imaging unit 11 and position information on the pixel for imaging obtained by performing interpolation on the AF pixel are recorded.

Further, in the image file F100, following the area of the shooting information DS1, DS2, . . . of the editing processing, information necessary for playback of thumbnail image data DT is allocated, and in a subsequent field, the thumbnail image data DT is allocated. Further, the raw data DR that is the main image data is allocated. Following the main image data, the image file F100 is formed to be able to add segmentation reference information that is information corresponding to the segmentation reference information (field F6) DS0B allocated to the shooting information DS0 of the time of shooting, and set at the time of the editing processing. Note that the information to be added has a similar field structure to the shooting information DS0 of the time of shooting, and in which history information is set similarly to the shooting information DS1, . . . at the time of the editing processing.

Here, in the image file F100, while the data amount of the raw data DR occupies about 95(%) of the entire data amount, the raw data DR is allocated to the end of the file. Therefore, by simply playing back about 5(%) from the head of the file, the thumbnail image data DT, the shooting information DS0, the shooting information DS1 and DS2 of the editing processing, and the like can be obtained.

As described above, when the image file generation unit 194 records the imaging result in the image file F100 according to the format illustrated in FIG. 8, the image file generation unit 194 generates the data of the image file F100 with the raw data DR output from the imaging unit 11, the shooting information DS and the thumbnail image data DT output from the recording control unit 195, and the thumbnail image data DT in JPEG generated in the image compression and decompression unit 193, under an instruction of the recording control unit 195, and outputs the data to the recording medium 16.

Figure 9:
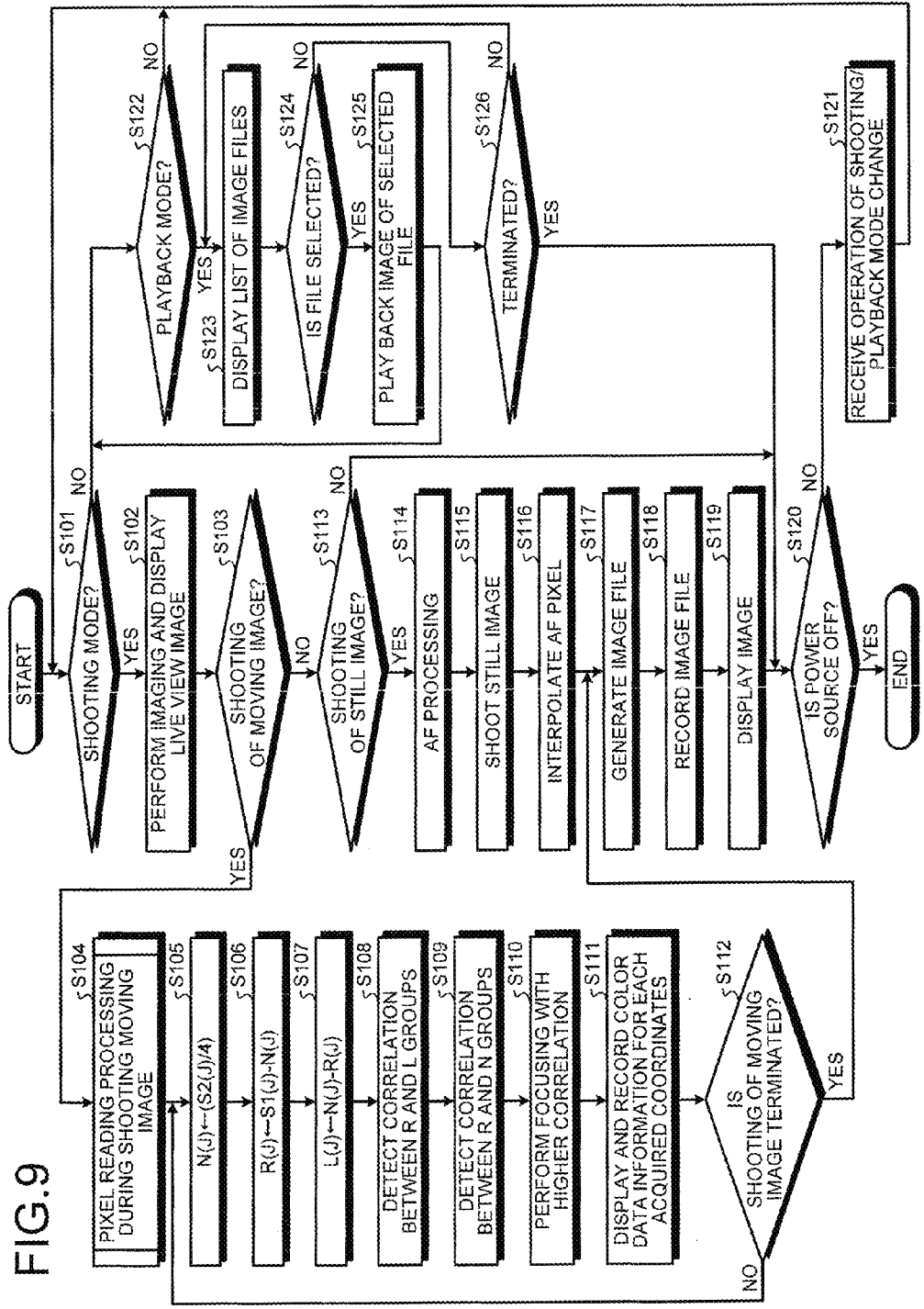
FIG. 9 is a flowchart illustrating an outline of processing executed by the imaging device according to the first embodiment of the present invention.

Next, processing executed by the imaging device 1 will be described. FIG. 9 is a flowchart illustrating an outline of processing executed by the imaging device 1.

As illustrated in FIG. 9, when a power source is applied to the imaging device 1, the control unit 19 determines whether the imaging device 1 is set to the shooting mode (step S101). When the control unit 19 has determined that the imaging device 1 is set to the shooting mode (Yes in step S101), the imaging device 1 proceeds to step S102 described below. In contrast, when the control unit 19 has determined that the imaging device 1 is not set to the shooting mode (No in step S101), the imaging device 1 proceeds to step S122 described below.

In step S102, the control unit 19 causes the imaging unit 11 to execute imaging, and causes the display unit 17 to display a live view image corresponding to image data input from the imaging unit 11. At this time, the image processing unit 192 applies thinning processing according to the number of display pixels of the display unit 17 to the image data from the imaging unit 11, and then outputs the image data to the display unit 17.

Following that, when an instruction signal that instructs shooting a moving image has been input from the operation input unit 14 (Yes in step S103), the imaging device 1 executes pixel reading processing during shooting a moving image, which reads pixels by every two rows from the imaging unit 11 during shooting a moving image (step S104).

Figure 10:
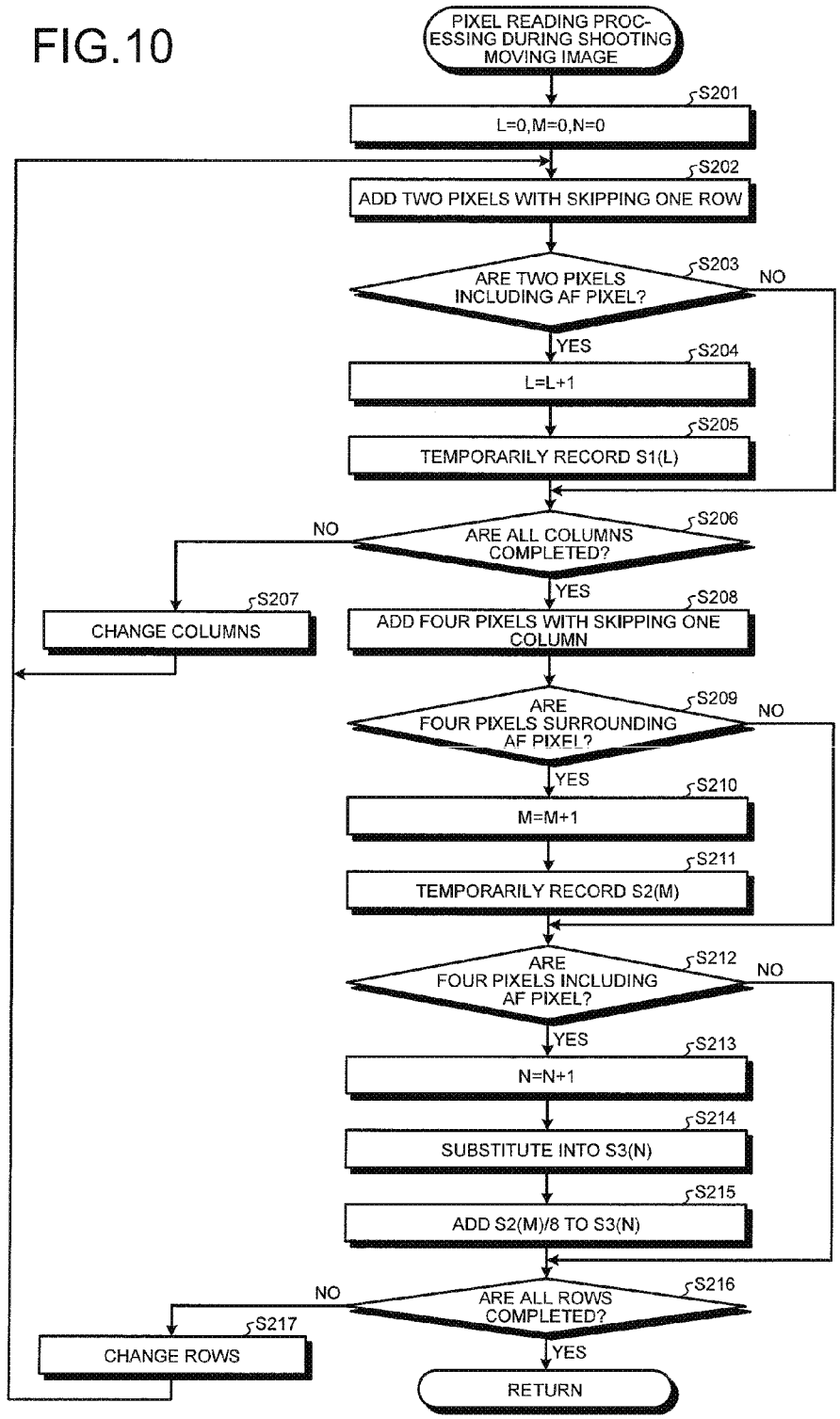
FIG. 10 is a flowchart illustrating an outline of pixel reading processing at moving image.

FIG. 10 is a flowchart illustrating an outline of pixel reading processing at moving image. As illustrated in FIG. 10, the imaging unit 11 initializes variables L, M, and N for performing calculation illustrated in FIG. 7 (step S201).

Following that, the imaging unit 11 adds two pixels of two rows with skipping one row by the vertical analog adding circuit 112 (step S202). Accordingly, for example, the added pixel value (D+F) of the green pixels D and F, the added pixel value (E+G) of the pixels E and G, ... of FIG. 6 are obtained.

Following that, when the two pixels of the two rows are two pixels including the AF pixel (Yes in step S203), the imaging unit 11 increments the variable L (L=L+1) (step S204), and temporarily records an added pixel value S1 (L)=(A+R) in the AF memory 114 (step S205). After step S205, the imaging unit 11 proceeds to step S206.

When the processing of all of columns of the light-receiving unit 111 has not been completed (No in step S206) when the two pixels of the two rows are not two pixels including the AF pixel (No in step S203), the imaging unit 11 changes the columns of the light-receiving unit 111 (step S207), and is retuned to step S202. In contrast, when the processing of all of columns of the light-receiving unit 111 has been completed (Yes in step S206), the imaging unit 11 proceeds to step S208.

Following that, the imaging unit 11 adds four pixels with skipping one column by the horizontal digital adding circuit 113 (step S208). Accordingly, for example, the added pixel value (D+F) and the added pixel value (E+G) are added.

Following that, when the added four pixels surround the AF pixel (Yes in step S209), the imaging unit 11 increments the variable M (step S210), and temporarily records an added pixel value S2 (M)=(D+E+F+G) in the AF memory 114 (step S211). Accordingly, the added pixel value of all of the four pixels surrounding the AF pixel is recorded in the AF memory 114. After step S211, the imaging unit 11 proceeds to step S212.

When the added four pixels do not surround the AF pixel (No in step S209), the imaging unit 11 proceeds to step S212.

Following that, when the added four pixels includes the AF pixel (Yes in step S212), the imaging unit 11 increments the variable N (step S213), and substitutes an added result of the four pixels (A+B+R+C) into the added pixel value S3 (N) (step S214).

Following that, the imaging unit 11 adds S2 (M)/8 to S3 (N) to obtain the added pixel value of the right side of FIG. 7(*d*), for example (step S215). After step S215, the imaging unit 11 proceeds to step S216.

In step S212, when the added four pixels do not include the AF pixel (No in step S212), the imaging unit 11 proceeds to step S216.

Following that, when all of rows of the light-receiving unit 111 have been completed (Yes in step S216), the imaging device 1 is returned to the main routine of FIG. 9. In contrast, when all of rows of the light-receiving unit 111 have not been completed (No in step S216), the imaging unit 11 changes the rows of the light-receiving unit 111 (step S217), and is returned to step S202.

Referring back to FIG. 9, description of moving onto step S105 will be continued. In step S105, the control unit 19 reduces an added pixel value S2 (J) of four pixels when a pixel surrounded by the four pixels of the same color is the AF pixel to ¼, thereby to estimate a pixel value N (J) when the AF pixel is configured from the N pixel.

Following that, the AF signal calculation unit 191 subtracts the pixel value N (J) when the R pixel is configured from the N pixel from an added value S1 (J) of two pixels including the R pixel (see FIG. 7(*e*)), thereby to estimate a pixel value R (J) of the R pixel (step S106).

Following that the AF signal calculation unit 191 subtracts the pixel value R (J) when the AF pixel is configured from the R pixel from the pixel value N (J) when the AF pixel value is configured from the N pixel, thereby to estimate a pixel value L (J) when the AF pixel is configured from the L pixel (step S107).

Following that, the AF signal calculation unit 191 detects correlation between an image signal obtained from the plurality of estimated pixel values R (J) and an image signal obtained from a plurality of estimated pixel values L (J) (step S108), and detects correlation between an image signal obtained from a plurality of estimated pixel values R (J) and an image signal obtained from a plurality of estimated pixel values N (J) (step S109).

Following that, the lens control unit 26 drives the driving unit 22 based on the AF signal input from the AF signal calculation unit 191 to focus the optical system 21 with higher correlation (step S110). To be specific, the AF signal calculation unit 191 employs a combination with which high correlation can be obtained, for phase difference detection of focusing. For example, when the correlation between an image signal obtained from the pixel value R (J) and an image signal obtained by a plurality of pixel values L (J) is higher, the AF signal calculation unit 191 detects a phase difference between the image signal obtained from the pixel value R (J) and the image signal obtained from the plurality of pixel values L (J), generates the AF signal for driving and controlling the interchangeable lens unit 20 based on the detected phase difference, and outputs the AF signal to the lens control unit 26. The AF signal is output to the lens control unit 26, and the lens control unit 26 drives the driving unit 22 to focus the optical system 21.

Following that, the image processing unit 192 generates an image of the time of imaging a moving image, using four added pixel values after focusing that are color data information of each obtained coordinates, applies specified image processing, and then causes the display unit 17 to display an image corresponding to the processed image data (step S111). Further, the image compression and decompression unit 193 applies encoding processing to the processed image data generated by the image processing unit 192, and then records the image data in the recording unit 15 (step S111).

Following that, when an instruction signal that terminates capturing of a moving image has been input through the operation input unit 14 (Yes in step S112), the imaging device 1 proceeds to step S117 described below. In contrast, when the instruction signal that terminates capturing of a moving image has not been input through the operation input unit 14 (No in step S112), the imaging device 1 is returned to step S105, and continues the capturing of a moving image.

When an instruction signal that instructs shooting of a still image has been input (Yes in step S113) when there is no instruction signal that instructs capturing of a moving image from the operation input unit 14 in step S103 (No in step S103), the imaging device 1 executes AF processing of automatically adjusting focusing (step S114), and shoots a still image (step S115). At this time, the control unit 19 records image data (raw data DR) input form the imaging unit 11 in the recording unit 15.

Next, the image processing unit 192 acquires the image data from the recording unit 15, and applies image processing including interpolation on the AF pixel to the acquired image data to generate processed image data (step S116).

Figure 11:
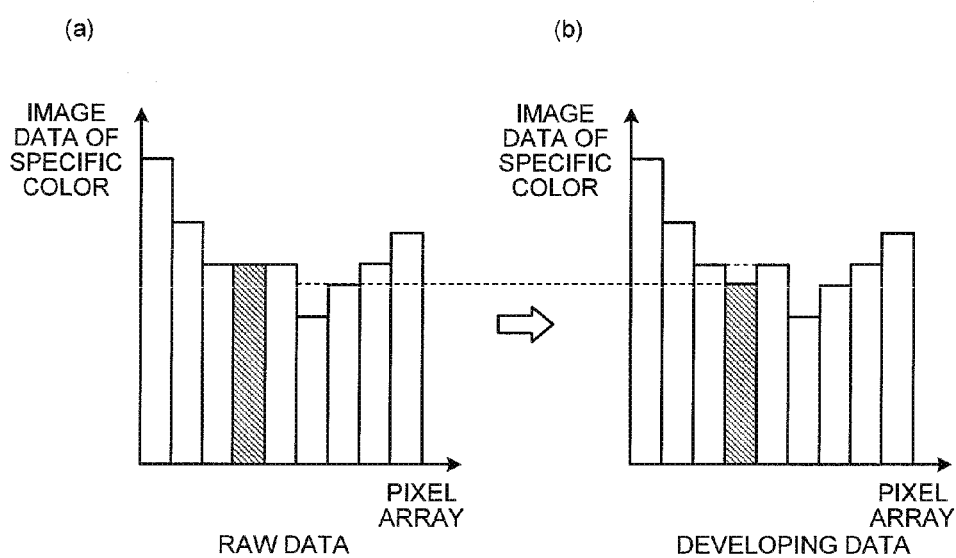
FIG. 11 is a schematic diagram illustrating image data of pixels when raw data imaged by the imaging device according to the first embodiment of the present invention is developed by another image processing device.

After that, the image file generation unit 194 generates an image file in which the raw data DR and the processed image data recorded in the recording unit 15 are recorded in association with position information of the AF pixel related to the position of the AF pixel in the imaging unit 11, the AF pixel having been subjected to the interpolation processing by the image processing unit 192, and position information related to the position of a pixel for imaging used for interpolation on the AF pixel (step S117), and records the generated image file in the recording medium 16 (step S118). Accordingly, as illustrated in FIG. 11, the imaging device 1 generates image data at a high speed in order to correspond to live view images, and records the image data as the raw data DR. Therefore, by using the position information of the AF pixel and the position information of the pixel for imaging obtained by replacing the AF pixel when another image processing device, for example, a computer develops the raw data DR, it is possible to generate an image subjected to more natural and accurate interpolation, replacement or composition. Note that the image file generation unit 194 generates an image file in which moving image data recorded in the recording unit 15 is recorded in association with the position information of the AF pixel and information of an interpolation pixel, similarly to the capturing of a still image.

Following that, the control unit 19 causes the display unit 17 to rec-view display an image corresponding to the recorded processed image data (step S119).

Following that, when the power source of the imaging device 1 is turned OFF (Yes in step S120), the imaging device 1 terminates the present processing. In contrast, when the power source of the imaging device 1 is not turned OFF (No in step S120), the imaging device 1 proceeds to step S121.

Following that, the control unit 19 receives an operation to change the mode of the imaging device 1 into the shooting mode or the playback mode according to an instruction signal input from the operation input unit 14 (step S121). After step S121, the imaging device 1 is returned to step S101.

In step S113, when the instruction signal that instructs shooting of a still image has not been input through the operation input unit 14 (No in step S113), the imaging device 1 proceeds to step S120.

Next, a case in which the imaging device 1 is not set to the shooting mode (No in step S101) will be described. In this case, when the imaging device 1 is set to the playback mode (Yes in step S122), the control unit 19 causes the display unit 17 to display a list of image files recorded in the recording medium 16 (step S123). To be specific, the control unit 19 causes the display unit 17 to display a list of thumbnail images corresponding to the image data included in the image file.

When the image file is selected (Yes in step S124), the control unit 19 causes the display unit 17 to play back an image corresponding to the image data of the selected image file (step S125). At this time, the image processing unit 192 performs the image processing using the raw data DR recorded in the image file and the position information of the interpolation pixel to develop the image data. Accordingly, in the first embodiment, the image processing unit 192 functions as an image processing device. Following that, the imaging device 1 is returned to step S122.

In step S124, when the image file is not selected within a specified time (for example, three seconds) (No in step S124), the imaging device 1 proceeds to step S126.

Following that, when an instruction signal that terminates the playback mode has been input from the operation input unit 14 (Yes in step S126), the imaging device 1 proceeds to step S120. In contrast, when the instruction signal that terminates the playback mode has not been input from the operation input unit 14 (No in step S126), the imaging device 1 is returned to step S123.

In step S122, when the imaging device 1 is not set to the playback mode (No in step S122), the imaging device 1 is returned to step S101.

According to the above-described first embodiment, the image file generation unit 194 generates the image file F100 in which the image data before image quality correction generated by the imaging unit 11, and the position information on the positions of the AF pixel in the imaging unit 11 and of the pixel for imaging (N pixel) obtained by interpolating the interpolation pixel are recorded in association with one another. Therefore, an image can be developed with high image quality in the post processing in which the image quality correction processing for display is applied to the raw data DR.

Further, according to the first embodiment, even if pixel values of a plurality of pixels are added and output from the imaging unit 11 having the AF pixel for high-speed processing at the time of a moving image, the added pixel value when the AF pixel is a normal pixel can be estimated with simple calculation processing, and a moving image with high image quality can be obtained. Further, even in this case, the pixel value of the AF pixel can be acquired with simple calculation processing, and focusing can be performed with high precision. Note that the simple calculation processing is to store each adding result according to whether a plurality of pixels to be added is pixels including the AF pixel or surrounding the AF pixel, and to perform simple four arithmetic operations to the stored adding results, and is capable of performing high-speed processing.

Further, in the first embodiment, the image processing unit 192 performs the image quality correction processing on the raw data DR based on the position information of the AF pixel and the position information of the pixel for imaging obtained by performing interpolation on the AF pixel to generate the processed image data. However, for example, an extracted pixel extracted in edge extraction is also applicable. In this case, the image processing unit 192 decreases the weight of the interpolation pixel based on position information of the extracted pixel, and pays attention to peripheral pixels, thereby to develop an image with higher image quality. Further, in typical noise reduction processing, a flat portion and an edge portion are determined. Determination criteria can be chanced according to the position information of the extracted pixel. As a result, unnecessary deterioration of the image quality due to the noise reduction processing by the image processing unit 192 can be prevented.

Further, in the first embodiment, an example of using only the R pixel as the AF pixel has been described. However, the present technology can be similarly applied to a case of using only the L pixel and a case of using both of the R and L pixels.

Further, in the first embodiment, an example of using pixels having the L imaging unit $11_R$ and the R imaging unit $11_R$ that receive light from the right and left in the horizontal direction as the AF pixel has been described. However, it is apparent that an example of using pixels having two imaging units that receive light from the up and down in the vertical direction as the AF pixel can also be similarly applied.

Further, in the first embodiment, the image data before image quality correction has been recorded as the raw data. However, the image data that is obtained by performing interpolation on the replacement pixel may be recorded as the raw data. Data of the replacement pixel before replacement (before image quality correction) may be separately recorded in the image file. Accordingly, any image data can be selected regardless of performing the image quality correction for display for the raw data DR. Correction, substitution, or replacement is performed with various methods, and image quality equivalent to the imaging device can be realized, and when there is the post processing of separately performing the image quality correction processing for display, the image can be developed with higher image quality using the information. Here, replacement of the data of the pixels has been devotedly described. However, not only replacement with another pixel, but also estimation and correction from a pattern of the image can be possible. These cases are all included and expressed by the term of replacement.

While, in the first embodiment, a pixel for focusing (AF pixel) has been corrected, there are an example of embedding a pixel for exposure adjustment in the imaging element, and an example of embedding a pixel for controlling the quantity of light of a stroboscope, or a pixel for correcting exposure in the imaging element. In both cases, similarly to the present embodiment, the pixels are not pixels or pixel data for shooting or for a playback display image, and the pixels are not used as they are and the above-described correction, substitution, or replacement processing is necessary. Therefore, it is important that the file includes information that indicates the positions of the pixels, when these pixels are handled in a post process, and what is more, information that indicates what kind of replacement or correction is to be performed may be included in the file. For example, the rules for replacement like FIG. 7 or information of a pixel for replacement may be included. By creating of such common rules, image processing most appropriate for a playback device can be applied at the time of playback. Especially, when the file is delivered or transmitted, the image is played back in a different device, and the device may be a PC, a smart phone, or a TV. Therefore, most appropriate image adjustment may just be performed according to circumstances of these playback devices.

Second Embodiment

Next, a second embodiment of the present invention will be described. An imaging device according to the second embodiment has a different configuration from the imaging device according to the first embodiment. Therefore, in the second embodiment, the configuration of the imaging device will be described first, and then processing executed by the imaging device according to the second embodiment will be described. Note that the same reference signs are used to refer to the same elements as those of the first embodiment.

Figure 12:
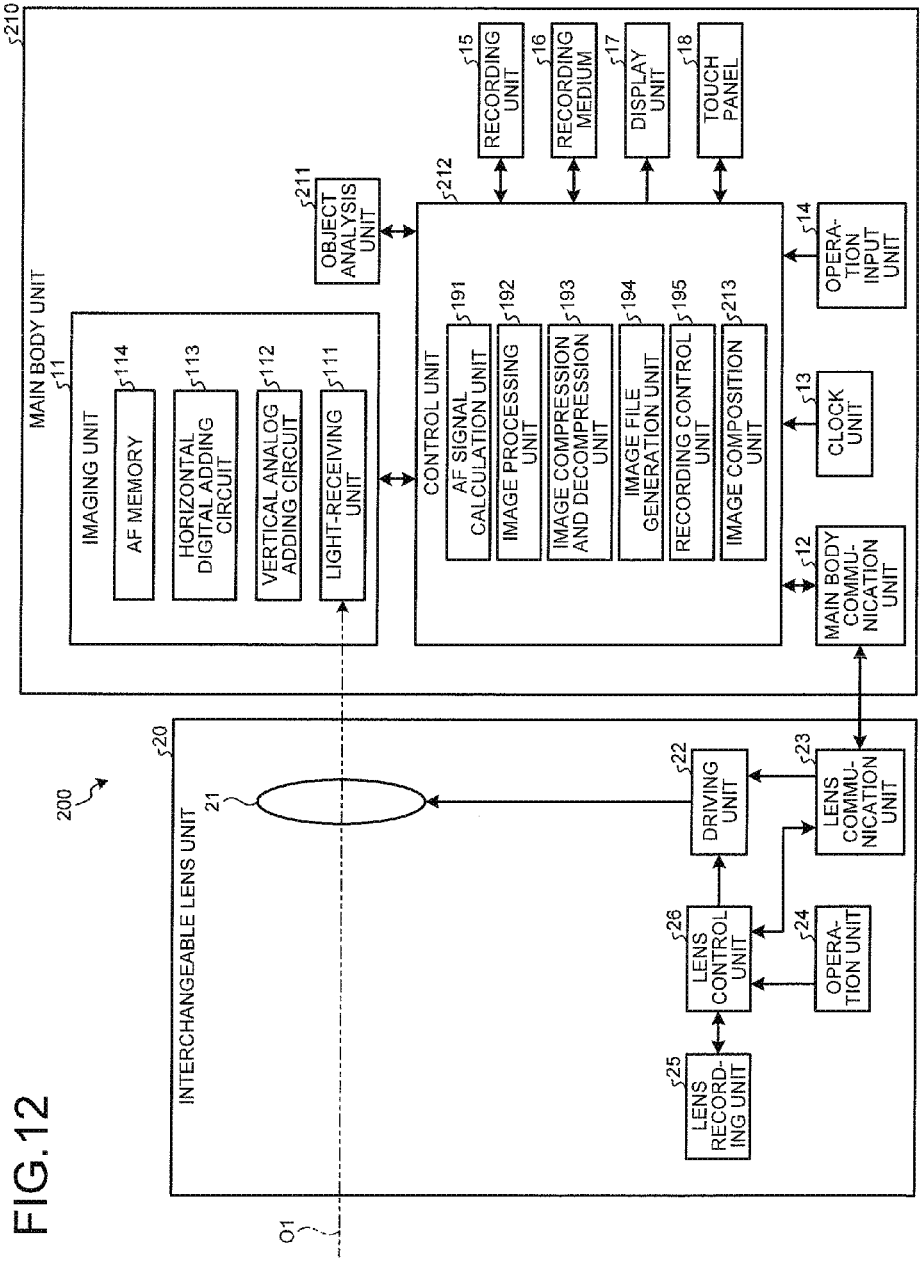
FIG. 12 is a block diagram illustrating a functional configuration of an imaging device according to a second embodiment of the present invention.

FIG. 12 is a block diagram illustrating a functional configuration of an imaging device according to the second embodiment of the present invention. An imaging device 200 according to FIG. 12 includes a main body unit 210 and an interchangeable lens unit 20.

The main body unit 210 includes an imaging unit 11, a main body communication unit 12, a clock unit 13, an operation input unit 14, a recording unit 15, a recording medium 16, a display unit 17, a touch panel 18, an object analysis unit 211, and a control unit 212.

The object analysis unit 211 analyzes a pixel area of the imaging unit 11 as a target of interpolation based on image data generated by the imaging unit 11 through the control unit 212. To be specific, the object analysis unit 211 analyzes brightness of an object or an exposure state, for example, a pixel area in an exposure value limit state (overexposure), in an underexposure state (underexposure), or in an appropriate exposure state, based on luminance information included in the image data, and outputs an analysis result to the control unit 212.

The control unit 212 is configured from a CPU, and the like. The control unit 212 transmits control signals or various data to respective units that configure the imaging device 200 according to an instruction signal input from the operation input unit 14 or the touch panel 18, thereby to comprehensively control the operation of the imaging device 200

A detailed configuration of the control unit 212 will be described. The control unit 212 includes an AF signal calculation unit 191, an image processing unit 192, an image compression and decompression unit 193, an image file generation unit 194, a recording control unit 195, and an image composition unit 213.

When the imaging device 200 performs capturing of an image in a high dynamic range (HDR) shooting mode, the image composition unit 213 generates image data with an expanded dynamic range based on the analysis result of the object analysis unit 211 and the image data input from the imaging unit 11. To be specific, the image composition unit 213 replaces a pixel in which a noise is caused or a saturated pixel with another pixel, using two image data input from the imaging unit 11, for example, image data (an overexposed image) in which the dynamic range is saturated in a part of pixels, and image data (an underexposed image) in which a noise is caused in a part of pixels, thereby to generate image data with an adjusted dynamic range.

Figure 13:
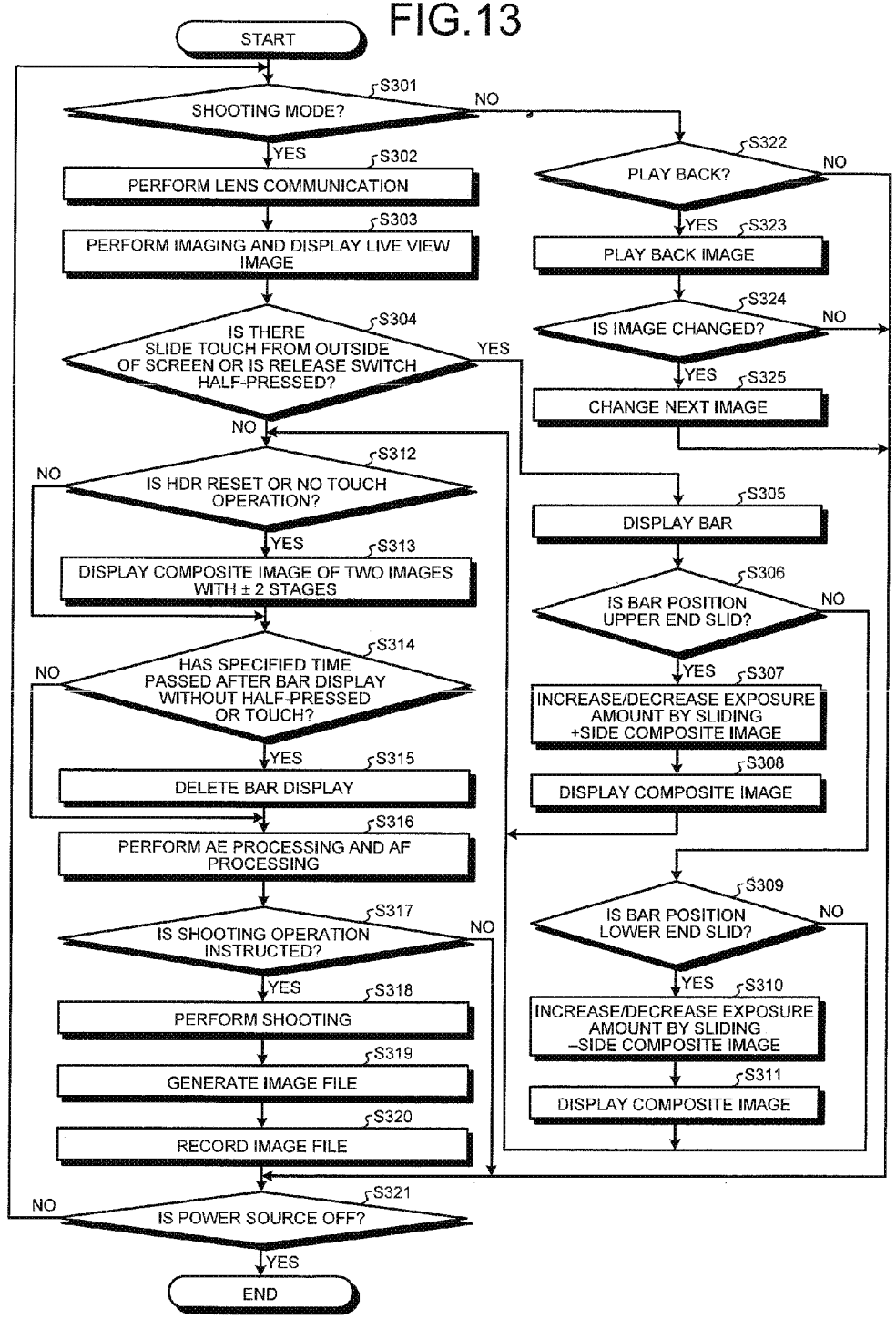
FIG. 13 is a flow chart illustrating an outline of processing executed by the imaging device according to the second embodiment of the present invention.

Processing executed by the imaging device 200 having the above-described configuration will be described. FIG. 13 is a flowchart illustrating an outline of processing executed by the imaging device 200.

As illustrated in FIG. 13, when the imaging device 200 is set to a shooting mode (Yes in step S301), the control unit 212 performs lens communication with the interchangeable lens unit 20 through the main body communication unit 12 and the lens communication unit 23 (step S302).

Following that, the control unit 212 causes the imaging unit 11 to execute imaging, and causes the display unit 17 to display a live view image corresponding to image data input from the imaging unit 11 (step S303). At this time, the image processing unit 192 applies thinning processing according to the number of display pixels of the display unit 17 to the image data from the imaging unit 11, and then outputs the image data to the display unit 17.

Following that, the control unit 212 determines whether there has been slide touch from an outside of the screen of the display unit 17 or a release switch of the operation input unit 14 has been half-pressed (step S304). To be specific, the control unit 212 detects, through the touch panel 18, a touch position from an outside of the screen of the display unit 17, and determines whether the touch position is changed with time, thereby to determine whether the slide touch has been performed. When the control unit 212 has determined that there has been slide touch from an outside of the screen of the display unit 17 or the release switch of the operation input unit 14 has been half-pressed (Yes in step S304), the imaging device 200 proceeds to step S305 described below. In contrast, when the control unit 212 has determined that there has not been slide touch from an outside of the screen of the display unit 17 or the release switch of the operation input unit 14 has not been half-pressed (No in step S304), the imaging device 200 proceeds to step S312 described below.

Figure 14:
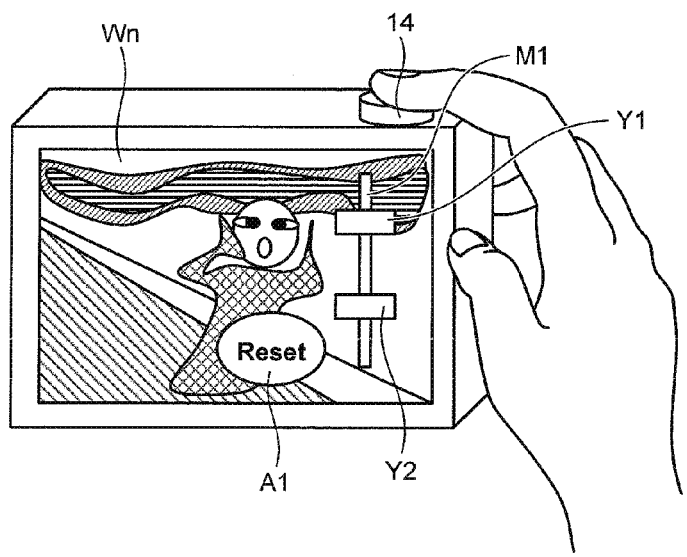
FIG. 14 is a diagram illustrating an example of an image displayed in a display unit of the imaging device according to the second embodiment of the present invention.

In step S305, the control unit 212 causes the display unit 17 to display an HDR bar M1 for adjusting the dynamic range when an HDR image is generated. To be specific, as illustrated in FIG. 14, the control unit 212 superimposes the HDR bar M1 on a live view image $W_n$ (n=natural number) displayed by the display unit 17, and causes the display unit 17 to display the superimposed image. Further, the control unit 212 superimposes a reset icon A1 for resetting generation of an HDR image on the live view image $W_n$, and causes the display unit 17 to display the superimposed image. On the HDR bar M1, a bar position upper end icon Y1 for receiving an input of an instruction signal that instructs image data of the overexposure side, and a bar position lower end icon Y2 for receiving an input of an instruction signal that instructs image data of the underexposure side are displayed, for example.

Figure 15:
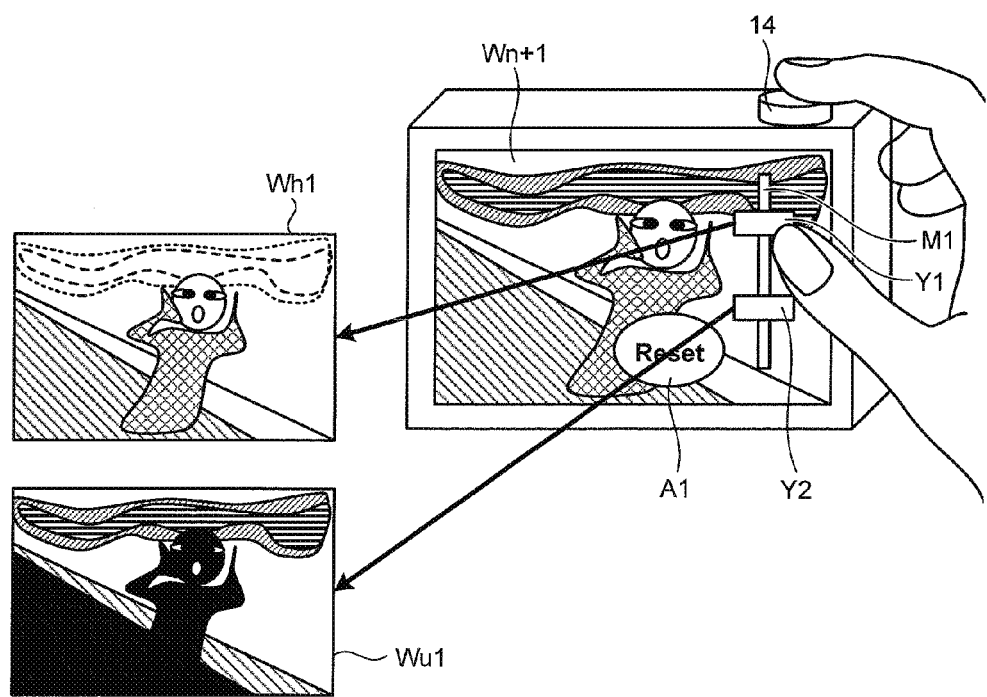
FIG. 15 is a diagram illustrating an example of an image of HDR shooting performed by the imaging device according to the second embodiment of the present invention.

Following that, when the bar position upper end icon Y1 has been slid and operated through the touch panel 18 (Yes in step S306), the control unit 212 increases/decreases the exposure amount according to a moving distance of the slide, using a "+" side image data as a reference of a composite image (step S307), and causes the display unit 17 to display the HDR composite image (step S308). For example, as illustrated in FIG. 15, the image composition unit 213 appropriately increases/decreases the exposure amounts of an image $W_{h1}$ and an image $W_{u1}$ to be mutually combined according to the moving distance of the slide, using the "+" side image $W_{h1}$ as a reference of the composite image, thereby to generate a composite image $W_{n+1}$. After step S308, the imaging device 200 proceeds to step S312.

Figure 16:
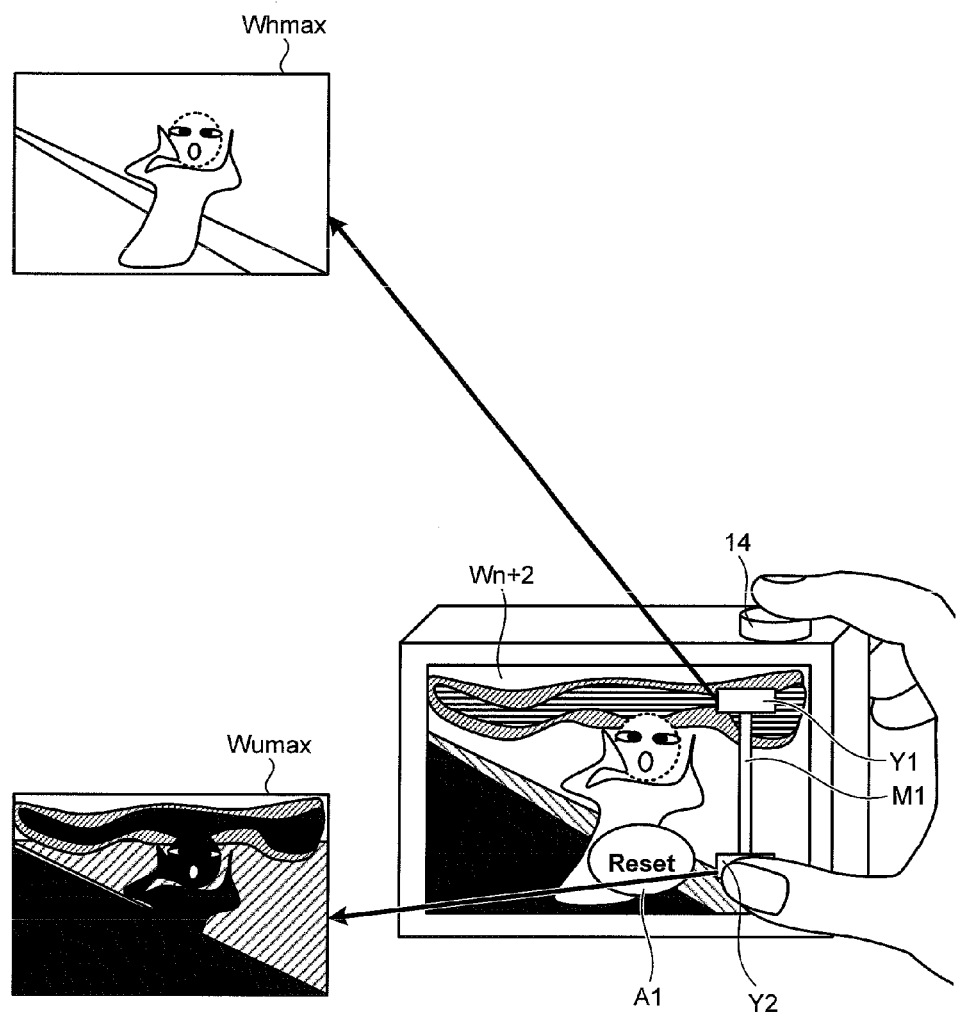
FIG. 16 is a diagram illustrating another example of an image of HDR shooting performed by the imaging device according to the second embodiment of the present invention.

When the bar position lower end icon Y2 has been slid and operated through the touch panel 18 (Yes in step S309), when the bar position upper end icon Y1 has not been slid and operated through the touch panel 18 (No in step S306), the image composition unit 213 increases/decreases the exposure amount according to the moving distance of the slide, using a "−" side image data as a reference of the composite image (step S310), and causes the display unit 17 to display the HDR composite image (step S311). For example, as illustrated in FIG. 16, the image composition unit 213 appropriately increases/decreases the exposure amounts of an image $W_{hmax}$ and an image $W_{umax}$ to be mutually combined according to the moving distance of the slide, using the "−" side image $W_{umax}$ as a reference of the composite image, thereby to generate a composite image $W_{n+2}$. After step S311, the imaging device 200 proceeds to step S312 described below.

In step S309, when the bar position lower end icon Y2 has not been slid and operated through the touch panel 18 (No in step S309), the imaging device 200 proceeds to step S312.

Following that the control unit 212 determines whether the reset icon A1 has been touched or there has been no touch operation after the display unit 17 displays a live view image (step S312). When the control unit 212 has determined that the reset icon A1 has been touched, or there has been no touch operation after the display unit 17 displays a live view image (Yes in step S312), the imaging device 200 proceeds to step S313. In contrast, when the control unit 212 has determined that the reset icon A1 has not been touched, or there has been a touch operation after the display unit 17 displays a live view image (No in step S312), the imaging device 200 proceeds to step S314.

In step S313, the image composition unit 213 combines two image data adjusted by ±2 stages from image data with appropriate exposure to generate the composite image. At this time, the image composition unit 213 may combine three image data of image data with appropriate exposure, image data with −2 stage exposure, and image data with +2 stage exposure to generate the composite image.

Following that, when there is no half-pressed operation or touch of the release switch of the operation input unit 14, and a specified time (for example, three seconds) has passed after the HDR bar M1 is displayed in the display unit 17 (Yes in step S314), the control unit 212 deletes the HDR bar M1 from the live view image in the display unit 17 (step S315). After step S315, the imaging device 200 proceeds to step S316. In contrast, when there is no half-pressed operation or touch of the release switch of the operation input unit 14, and a specified time (for example, three seconds) has not passed after the HDR bar M1 is displayed in the display unit 17 (No in step S314), the imaging device 200 executes AE processing and AF processing (step S316).

Next, when a 2nd release signal has been input through a release switch of the operation input unit 14 (Yes in step S317), the imaging device 200 executes capturing of a still image (step S318). At this time, the control unit 212 records two image data (raw data DR) input from the imaging unit 11 in the recording unit 15.

Figure 17:
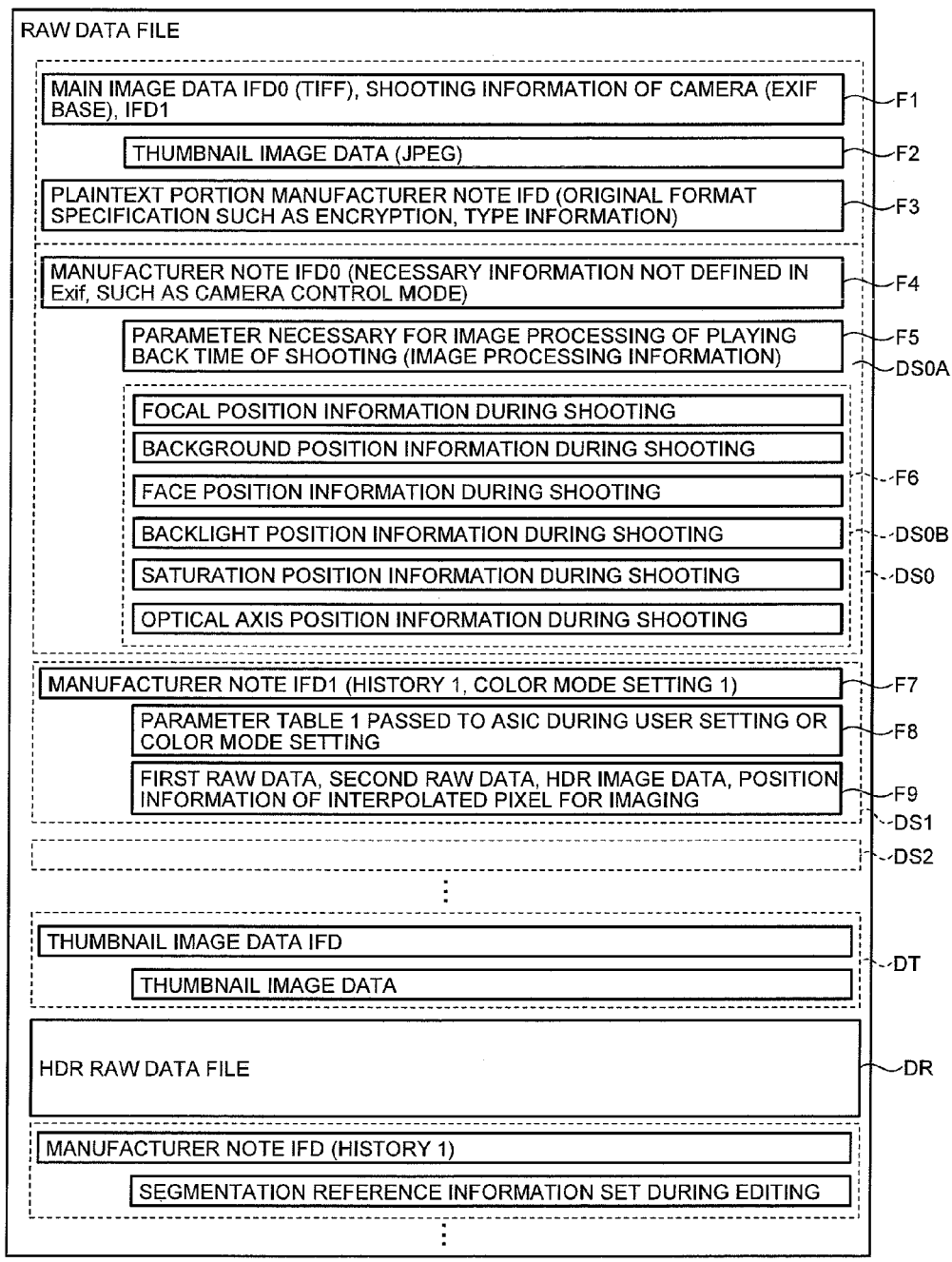
FIG. 17 is a diagram illustrating an example of an image file generated by an image file generation unit of the imaging device according to the second embodiment of the present invention.

After that, the image file generation unit 194 generates an image file in which two image data (raw data DR) before correction recorded in the recording unit 15 and the HDR image raw data generated by the image composition unit 213 as the raw data DR are recorded in association with position information of pixels obtained by mutually adding pixels for interpolation in the HDR image raw data (step S319). To be specific, as illustrated in FIG. 17, the image file generation unit 194 generates the image file. In a field F9 of this image file F200, the two raw data before correction (first raw data and second raw data) and the HDR image data are stored. Further, in the field F9, position information related to positions of pixels mutually added and replaced in the HDR image raw data is recorded.

Figure 18:
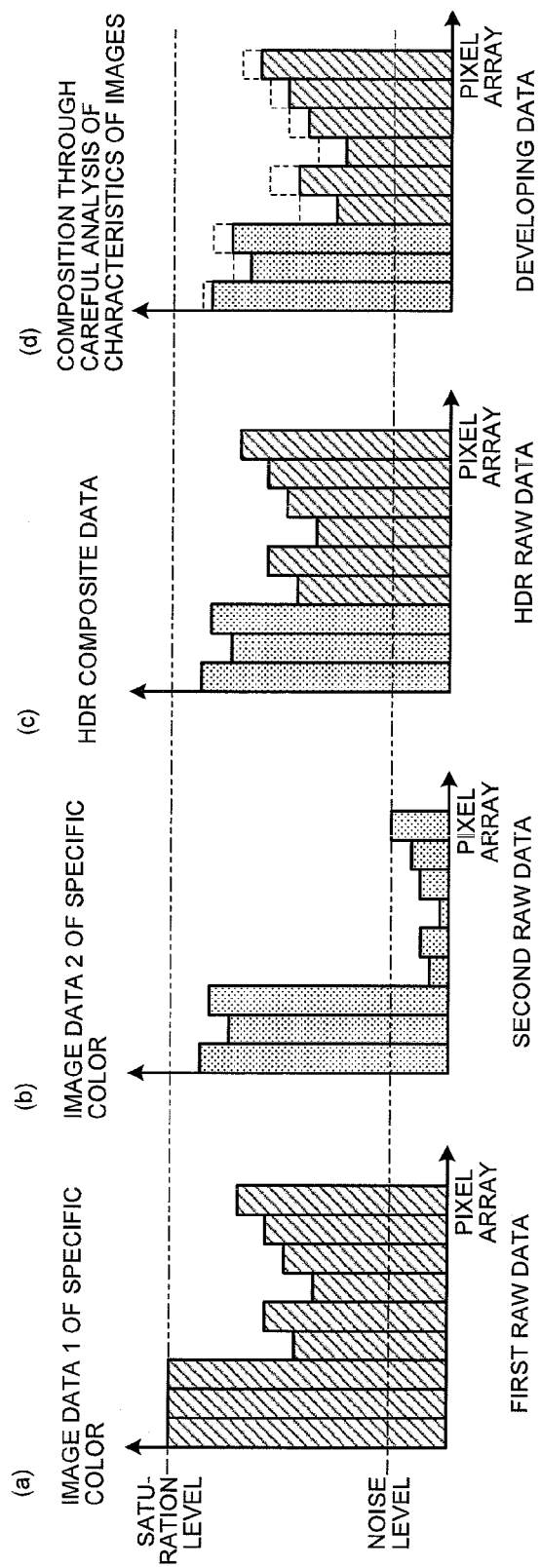
FIG. 18 is a schematic diagram illustrating image data of pixels when raw data imaged by the imaging device according to the second embodiment of the present invention is developed by another image processing device.

Following that, the image file generation unit 194 records the generated image file in the recording medium 16 (step S320). Accordingly, as illustrated in FIG. 18, the imaging device 200 generates the image data at a high speed in order to correspond to live view images, and records the image data as the raw data DR. Therefore, when another image processing device, for example, a computer develops the HDR image using the raw data DR, the image processing device can generate an HDR image subjected to more natural and accurate image processing including replacement, composition, or correction (FIG. 18(d)) by using the position information of the replacement pixel (FIG. 18(a) to FIG. 18(c)).

Following that, when a power source of the imaging device 200 is turned OFF (Yes in step S321), the imaging device 200 terminates the present processing. In contrast, when the power source of the imaging device 200 is not turned OFF (No in step S321), the imaging device 200 is returned to step S301.

When the imaging device 200 is set to a playback mode (Yes in step S322), when the imaging device 200 is not set to the shooting mode in step S301 (No in step S301), the control unit 212 causes the display unit 17 to play back the image data in the image file recorded in the recording medium 16 (step S323). At this time, the image processing unit 192 may generate the HDR image based on the two raw data stored in the image file and the position information of the replacement pixel. Accordingly, shooting is not performed. Thus, even if the time of the image processing becomes longer than the time of shooting, the time of the image processing can be made long, and an HDR image subjected to the image processing such as more natural replacement or composite can be generated (for example, see FIG. 18).

Next, when an image has been changed through the operation input unit 14 (Yes in step S324), the control unit 212 changes the image file to a next image file recorded in the recording medium 16 (step S325), and the imaging device 200 proceeds to step S321. In contrast, when an image is not changed through the operation input unit 14 (No in step S324), the imaging device 200 proceeds to step S321.

In step S322, when the imaging device 200 is not set to the playback mode (No in step S322), the imaging device 200 proceeds to step S321.

According to the above-described second embodiment, the image file generation unit 194 generates the image file F200 in which the image data before image quality correction generated by the imaging unit 11, and the position information on the respective positions of the correction pixel by the image processing in the imaging unit 11 and of the another pixel for imaging in replacement of the correction pixel are associated with one another. Therefore, when the image quality correction processing for display is performed for the raw data DR, an image with high image quality can be developed.

Figure 19:
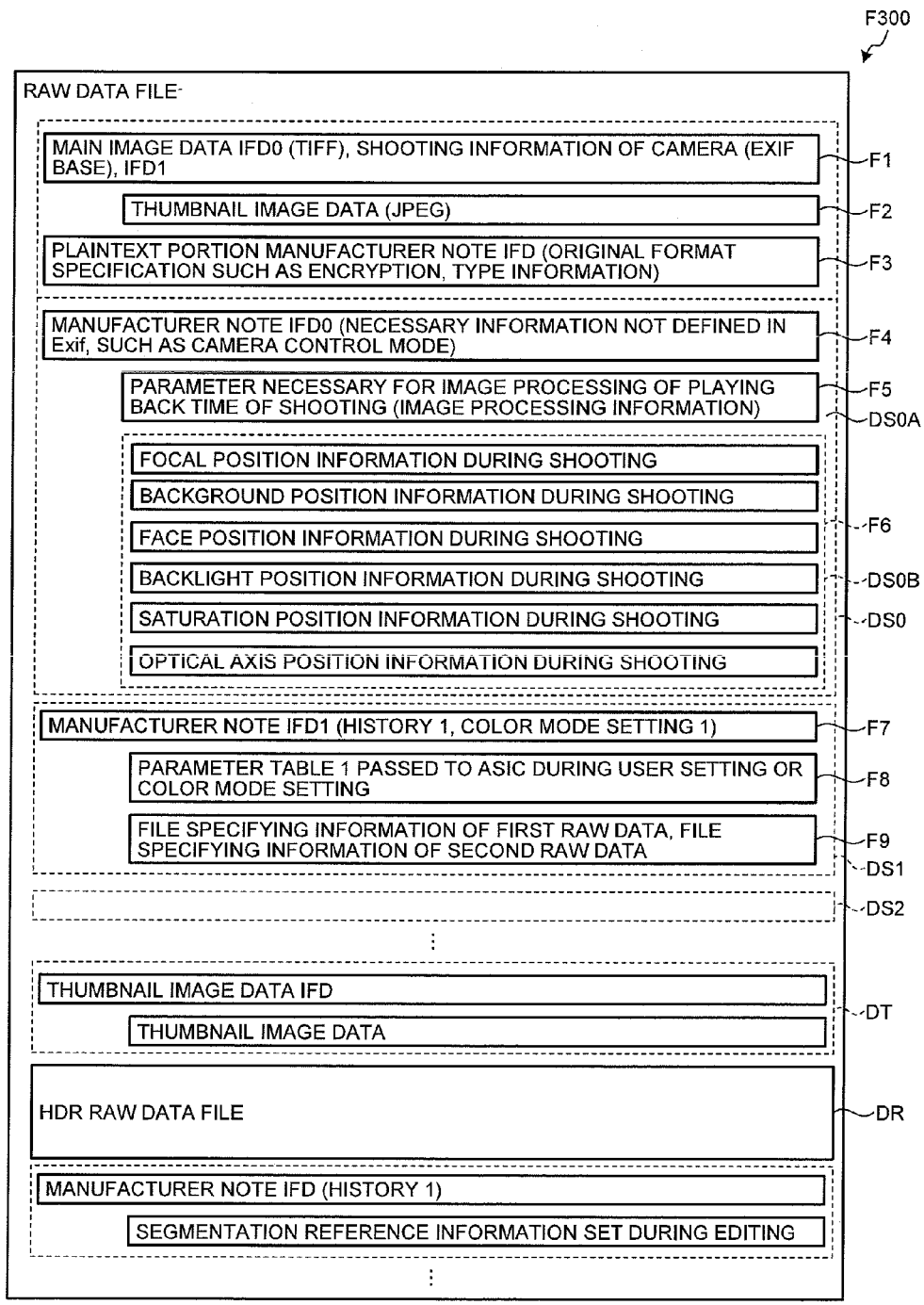
FIG. 19 is a diagram illustrating an example of an image file generated by an image file generation unit of an imaging device according to a modification of the second embodiment of the present invention.

Further, in the second embodiment, the first raw data and the second raw data are recorded in one image file. However, for example, as illustrated in FIG. 19, information specifying image files of the first raw data and the second raw data in the recording medium 16 may be recorded in association with each other in an image file F300 in which the HDR raw data is recorded. Accordingly, the capacity of one image file can be made small.

Further, in the second embodiment, the image file F200 in which the image data before image quality correction, and position information on respective positions of the correction pixel by the image processing in the imaging unit 11 and of another pixel for imaging in replacement of the correction pixel are associated with one another is generated. However, data (data indicating a pixel) indicating a pixel portion that needs correction, before image quality correction may be recorded as the raw data, or data (data indicating a pixel) indicating a pixel portion corrected after the image quality correction may be recorded as the raw data. Data indicating an area may be separately recorded in the image file, instead of each pixel. As described above, as long as a corrected portion or a portion that needs correction is recorded, correction of the image quality of the portion, substitution of the image, replacement of data can be performed by various method, and image quality different from an imaging device can be realized.

Further, in the second embodiment, replacement of data of pixels has been described. However, not only replacement with another pixel, but also estimation and correction from a pattern of the image can be possible. These cases are all included and expressed by the term of replacement. Here, the HDR image portion has been corrected. However, an image portion that needs replacement may be recorded in a replaceable manner. In both cases, similarly to the present embodiment, the pixels are not pixel data that can be used for shooting or for a playback display image as they are, and the above-described correction, substitution, or replacement processing is necessary. Therefore, it is important that the file includes information that indicates the positions of the pixels, when these pixels are handled in a post process, and what is more, information that indicates what kind of replacement or correction is to be performed may be included in the file. Rules for replacement or information of a pixel for replacement may be included. By creating of such common rules, image processing most appropriate for a playback device can be applied at the time of playback. Especially, when the file is delivered or transmitted, the image is played back in a different device, and the device may be a PC, a smart phone, or a TV. Therefore, most appropriate image adjustment may just be performed according to circumstances of these playback devices.

Further, even an image playback device that performs image playback of an image file in which image data is recorded can execute the present invention. Specifically, the image playback device executes: an acquisition step of acquiring target-of-replacement pixel information on a position of a replacement pixel that constitutes an image corresponding to the image data and is replaced with another pixel; an identifying step of identifying the replacement pixel from a plurality of electrical signals respectively output from a plurality of pixels that constitutes the image corresponding to the image data, based on the target-of-replacement pixel information acquired in the acquisition step; a generation step of perform interpolation on the replacement pixel identified in the identifying step with the plurality of electrical signals respectively output from a plurality of images to generate interpolated image data; and a playback step of playing back the interpolated image data generated in the generation step. Accordingly, when the image quality correction processing for display is performed for the raw data, the degree of freedom at the time of playback can be increased and the image can be played back with high image quality. Further, by performing interpolation on a corrected portion or a portion that needs correction, correction of the image quality of the portion, substitution of the image, or replacement of data can be performed by various methods, and the image can be played back with image quality different from the imaging device. Here, the image playback device is an imaging device, a mobile device including a smart phone, an electronic device such as a tablet type mobile device, a head mount display, or an information processing device provided with a display monitor such as a PC.

Further, in the present invention, the image processing unit is incorporated in the control unit. However, the image processing unit may be separately provided, for example. Further, a plurality of image processing units (image engines) may be provided.

Further, in the present invention, the image processing unit is incorporated in the imaging device as an image processing device. However, the image processing unit may be separately provided.

Further, in the present invention, the image file is recorded in the recording medium. However, the image file may be output to another image processing device through the Internet, for example, to an electronic device such as a mobile phone or a tablet-type mobile device including the image processing unit.

Further, the imaging device according to the present invention can be applied to an electronic device, such as a digital video camera that can mount accessories or the like or a mobile phone or a tablet-type mobile device including a shooting function, other than a digital camera or a digital single-lens reflex camera.

Note that, in the description of the flowcharts in the present specification, the sequence of the processing among the steps has been specified using the wording of "first", "then", "following that", and the like. However, the order of the processing necessary for implementing the present invention is not uniquely determined by such wording. That is, the order of the processing in the flowcharts described in the present specification can be changed without inconsistency.

Further, the program executed by the imaging device and the image processing device according to the present invention is recorded and provided as file data in an installable or executable format in a computer-readable recording medium, such as a CD-ROM, a flexible disk (FD), a CD-R, a digital versatile disk (DVD), a USB medium, or a flash memory.

Further, the program executed by the imaging device or the image processing device according to the present invention may be provided by being stored in a computer connected to a network, such as the Internet, and being downloaded through the network. Further, the program executed by the imaging device or the image processing device according to the present invention may be provided or distributed through the network such as the Internet.

As described above, the present invention may include various embodiments that are not described here, and various design changes, and the like may be made within the scope of the technical idea specified by claims.

According to some embodiments, the image file generation unit generates an image file in which raw data, and position information on a position of an interpolation pixel or a replacement pixel are recorded in association with each other. Therefore, when image quality correction processing for display is performed on the raw data, it is possible to increase the degree of freedom at the time of playback and to develop the raw data with high image quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
   an imaging unit having an imaging element formed of a plurality of pixels, and configured to perform imaging under a first exposure condition to generate first image data and to perform imaging under a second exposure condition different from the first exposure condition to generate second image data;
   an image composition unit configured to generate composite image data with an expanded dynamic range based on the first image data and the second image data; and
   an image file generation unit configured to generate an image file in which the first image data, the second image data, the composite image data, and position information data on positions of pixels obtained by mutually adding pixels for interpolation in a first image corresponding to the first image data and a second image corresponding to the second image data when the image composition unit generates the composite image data, are recorded in association with one another.

2. The imaging device according to claim 1, further comprising an operation input unit configured to receive an input of an instruction signal for changing the first exposure condition or the second exposure condition, wherein
   the imaging unit is configured to generate the first image data and the second image data according to the instruction signal input from the operation input unit.

3. The imaging device of claim 1, further comprising:
   a removable memory card recording medium storing the image file generated.

4. The imaging device of claim 1 wherein the image file further includes shooting information and a thumbnail image.

5. The imaging device of claim 1 wherein the position information is stored for a subset of all of the pixel positions in the first and second image data.

6. An image processing device for performing image processing on image data in an image file generated by an imaging device including an image unit having an imaging element formed of a plurality of pixels, the image processing device comprising:
   an image processing unit configured to acquire an image file in which first image data imaged and generated by the imaging unit under a first exposure condition, a second image data imaged and generated under a second exposure condition different from the first exposure condition, and position information data on positions of pixels obtained by mutually adding pixels for interpolation in a first image corresponding to the first image data and a second image corresponding to the second image data are recorded in association with one another, and to combine the first image data and the second image data to generate processed image data with an expanded dynamic range, based on the position information recorded in the image file.

7. A recording method executed by an imaging device comprising an imaging unit having an imaging element formed of a plurality of pixels, the recording method comprising:
   a first generation step of performing imaging under a first exposure condition to generate first image data;
   a second generation step of performing imaging under a second exposure condition different from the first exposure condition to generate second image data;
   an image composition step of generating composite image data with an expanded dynamic range, based on the first image data and the second image data; and
   an image file generation step of generating an image file in which the first image data, the second image data, the composite image data, and position information data on positions of pixels obtained by mutually adding pixels for interpolation in a first image corresponding to the first image data and a second image corresponding to the second image data when the composite image data is generated in the image composition step, are recorded in association with one another.

8. The recording method of claim 7, further comprising:
a recording step of storing the image file generated on a removable memory card recording medium.

9. The recording method of claim 7 wherein the image file further includes shooting information and a thumbnail image.

10. The recording method of claim 7 wherein the position information is stored for a subset of all of the pixel positions in the first and second image data.

11. A non-transitory computer-readable recording medium with an executable program stored thereon, the program instructing an imaging device comprising an imaging unit having an imaging element formed of a plurality of pixels, to perform:
   a first generation step of performing imaging under a first exposure condition to generate first image data;
   a second generation step of performing imaging under a second exposure condition different from the first exposure condition to generate second image data;
   an image composition step of generating composite image data with an expanded dynamic range, based on the first image data and the second image data; and
   an image file generation step of generating an image file in which the first image data, the second image data, the composite image data, and position information data on positions of pixels obtained by mutually adding pixels for interpolation in a first image corresponding to the first image data and a second image corresponding to the second image data when the composite image data is generated in the image composition step, are recorded in association with one another.

12. The non-transitory computer-readable recording medium of claim 11, wherein the program further instructs the imaging device to perform:
a recording step of storing the image file generated on a removable memory card recording medium.

13. The non-transitory computer-readable recording medium of claim 11 wherein the image file further includes shooting information and a thumbnail image.

14. The non-transitory computer-readable recording medium of claim 11 wherein the position information is stored for a subset of all of the pixel positions in the first and second image data.

* * * * *